(12) United States Patent
Wittmaak, Jr. et al.

(10) Patent No.: US 12,679,535 B2
(45) Date of Patent: Jul. 14, 2026

(54) MODULAR TANDEM TILTROTOR AIRCRAFT

(71) Applicant: Textron Innovations Inc., Providence, RI (US)

(72) Inventors: John Robert Wittmaak, Jr., Newark, TX (US); Steven M. Loveland, Fort Worth, TX (US); Joshua Allan Edler, Bedford, TX (US); Alan Hisashi Steinert, Fort Worth, TX (US); Stephen Yibum Chung, Keller, TX (US); Matthew Edward Louis, Fort Worth, TX (US)

(73) Assignee: Textron Innovations, Inc., Providence, RI (US)

( * ) Notice: Subject to any disclaimer, the term of this patent is extended or adjusted under 35 U.S.C. 154(b) by 682 days.

(21) Appl. No.: 17/081,654

(22) Filed: Oct. 27, 2020

(65) Prior Publication Data

US 2021/0114723 A1      Apr. 22, 2021

Related U.S. Application Data

(63) Continuation-in-part of application No. 16/249,325, filed on Jan. 16, 2019, now Pat. No. 12,559,231.

(51) Int. Cl.
*B64C 29/00* (2006.01)
*B64U 10/25* (2023.01)
(Continued)

(52) U.S. Cl.
CPC .......... B64C 29/0033 (2013.01); B64U 10/25 (2023.01); B64U 20/40 (2023.01); B64U 30/297 (2023.01); B64C 2211/00 (2013.01)

(58) Field of Classification Search
CPC .. B64C 29/0033; B64C 2211/00; B64U 20/40
See application file for complete search history.

(56) References Cited

U.S. PATENT DOCUMENTS

| | | | |
|---|---|---|---|
| 3,081,964 A | 3/1963 | Quenzler | |
| 3,089,666 A | * 5/1963 | Quenzler | ............ B64C 29/0033 |
| | | | 244/66 |

(Continued)

FOREIGN PATENT DOCUMENTS

| | | |
|---|---|---|
| CN | 105775117 B | 3/2019 |
| RU | 2507122 C1 | 2/2014 |
| WO | 2017153807 | 9/2017 |

OTHER PUBLICATIONS

European Patent Office ; Communication Pursuant to Article 94(3) EPC; Dec. 9, 2020; p. 1-4.
European Search Report; EP 20150282.2, 1 pages, May 25, 2020.

*Primary Examiner* — Marisa V Conlon
(74) *Attorney, Agent, or Firm* — Whitaker Chalk Swindle & Schwartz PLLC; Enrique Sanchez, Jr.; Juan Vasquez

(57) ABSTRACT

A modular tandem tiltrotor aircraft in which the tiltrotor assemblies are operably coupled at the forward and aft ends of the fuselage of the aircraft is disclosed. The modular tandem tiltrotor assemblies are capable of rotating between a vertical lift position and a horizontal flight position. The modular tandem tiltrotor aircraft can be structurally more efficient and lower drag than a conventional tiltrotor, has better control authority and lifting capacity than hybrid-quads and tail-sitters, and has more range than a helicopter or multi-rotor. The modular tandem tiltrotor aircraft can orbit and search over a broad area, or can hover for long periods, depending on the application. Instead of providing a multi-function tandem tiltrotor aircraft that is generally suited for all applications, but not optimized for any, the modular tandem tiltrotor aircraft allows for customized configuration to optimize the aircraft for a particular application.

10 Claims, 23 Drawing Sheets

(51) Int. Cl.
  B64U 20/40      (2023.01)
  B64U 30/297     (2023.01)

(56)            References Cited

U.S. PATENT DOCUMENTS

| | | | |
|---|---|---|---|
| D239,522 S * | 4/1976 | Wheatley | D12/335 |
| 5,709,357 A | 1/1998 | Wilmowsky | |
| 7,922,115 B2 * | 4/2011 | Colgren | B64C 39/024 |
| | | | 244/45 R |
| 8,660,712 B2 * | 2/2014 | Grabowsky | B64C 39/00 |
| | | | 701/3 |
| 9,085,355 B2 | 7/2015 | DeLorean | |
| 9,108,730 B2 * | 8/2015 | Grossman | B64F 1/32 |
| 9,623,967 B2 * | 4/2017 | Mallard | B64C 39/024 |
| 9,975,644 B1 * | 5/2018 | Kimchi | B64U 50/19 |
| 10,287,011 B2 * | 5/2019 | Wolff | B64C 29/0033 |
| 10,450,062 B1 | 10/2019 | Bova et al. | |
| 10,501,183 B2 * | 12/2019 | Foster | B64D 1/04 |
| 10,518,873 B2 | 12/2019 | Netzer | |
| 10,787,255 B2 * | 9/2020 | George | B64C 29/0033 |
| 2018/0222580 A1 | 8/2018 | DeLorean | |
| 2018/0370629 A1 | 12/2018 | Finlay et al. | |
| 2019/0061936 A1 | 2/2019 | North et al. | |
| 2021/0339860 A1 * | 11/2021 | Agostino | B64D 27/02 |

* cited by examiner

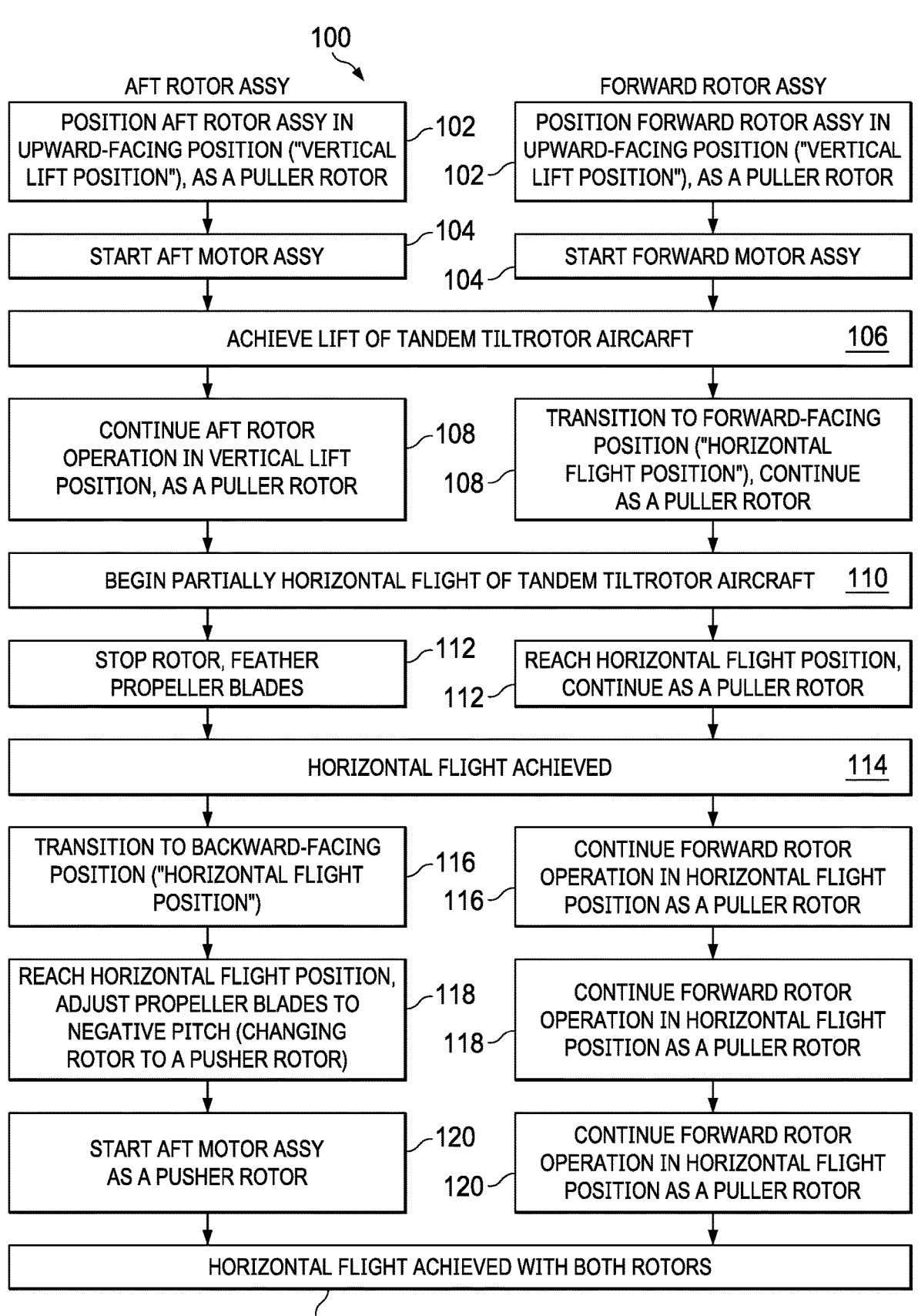

100

AFT ROTOR ASSY

FORWARD ROTOR ASSY

POSITION AFT ROTOR ASSY IN UPWARD-FACING POSITION ("VERTICAL LIFT POSITION"), AS A PULLER ROTOR — 102

POSITION FORWARD ROTOR ASSY IN UPWARD-FACING POSITION ("VERTICAL LIFT POSITION"), AS A PULLER ROTOR
102

START AFT MOTOR ASSY — 104

START FORWARD MOTOR ASSY
104

ACHIEVE LIFT OF TANDEM TILTROTOR AIRCARFT          106

CONTINUE AFT ROTOR OPERATION IN VERTICAL LIFT POSITION, AS A PULLER ROTOR — 108

TRANSITION TO FORWARD-FACING POSITION ("HORIZONTAL FLIGHT POSITION"), CONTINUE AS A PULLER ROTOR
108

BEGIN PARTIALLY HORIZONTAL FLIGHT OF TANDEM TILTROTOR AIRCRAFT          110

STOP ROTOR, FEATHER PROPELLER BLADES — 112

REACH HORIZONTAL FLIGHT POSITION, CONTINUE AS A PULLER ROTOR
112

HORIZONTAL FLIGHT ACHIEVED          114

TRANSITION TO BACKWARD-FACING POSITION ("HORIZONTAL FLIGHT POSITION") — 116

CONTINUE FORWARD ROTOR OPERATION IN HORIZONTAL FLIGHT POSITION AS A PULLER ROTOR
116

REACH HORIZONTAL FLIGHT POSITION, ADJUST PROPELLER BLADES TO NEGATIVE PITCH (CHANGING ROTOR TO A PUSHER ROTOR) — 118

CONTINUE FORWARD ROTOR OPERATION IN HORIZONTAL FLIGHT POSITION AS A PULLER ROTOR
118

START AFT MOTOR ASSY AS A PUSHER ROTOR — 120

CONTINUE FORWARD ROTOR OPERATION IN HORIZONTAL FLIGHT POSITION AS A PULLER ROTOR
120

HORIZONTAL FLIGHT ACHIEVED WITH BOTH ROTORS

MODULAR TANDEM TILTROTOR AIRCRAFT

CROSS-REFERENCE TO RELATED APPLICATION

The present application is a continuation-in-part of U.S. patent application Ser. No. 16/249,325, entitled "TANDEM TILTROTOR AIRCRAFT," filed on Jan. 16, 2019, the contents of which are hereby incorporated by reference in their entirety.

BACKGROUND

1. Field of the Invention

The present invention is generally related tiltrotor aircraft, and specifically to modular tiltrotor aircraft in which the rotors of the aircraft are located at the aft and forward ends of the fuselage.

2. Background of the Invention and Description of Related Art

Like helicopters, traditional tiltrotor aircraft are utilized in situations in which completely vertical take-off and landing of the aircraft is desired. Once in the air, and as the aircraft starts to propel itself forward, the rotors of the aircraft tilt from a vertical to a horizontal position to better facilitate horizontal flight. Traditional tiltrotor aircraft incorporate the rotors into the wing tips of the aircraft. This requires the wing to carry the aircraft weight cantilevered at the far end of the wing. To facilitate this design, a considerable amount of structural support is required in the wings of the aircraft, since the wing must be much stronger at its extremes than a normal airplane wing. Each rotor nacelle also adds to the aircraft's drag profile.

Traditional tiltrotor aircraft are incapable of incorporating the rotors into the fuselage of the aircraft due to space limitations associated with a tiltrotor system. Having a rotor at the front of the fuselage would not allow the aircraft to have a functional cockpit.

Tandem rotor aircraft are able to incorporate rotors to the fuselage of the aircraft since the rotors do not tilt and thus do not require the same amount of space as the rotors of tiltrotor aircraft. Like tiltrotor aircraft, tandem rotor aircraft are used in situations in which vertical take-off and landing is desired. However, because the rotors of tandem rotor aircraft are not able to tilt, the aircraft do not have the desirable horizontal flight properties of tiltrotor aircraft. However, due to these design trade-offs, conventional solutions often suffer in their ability to lift significant payloads or to carry payloads long distances.

SUMMARY

A Tandem Tiltrotor (TTR) allows the wing to be optimized for aerodynamic performance without the limitations associated to carrying a nacelle at the wing tip (on ground) and conversely without carrying aircraft weight from the nacelles during hovers. Fuselages on most aircraft are typically very structural to begin with so moving the nacelles to the fuselage results in weight savings as well. With the nacelles disposed on the fuselage, they are coaxial in forward flight and do not add to the drag profile like wing-tip nacelles would. A rotor mounted near the front of the aircraft and another mounted near the rear provide lift for hovering.

The TTR is able to bridge both payload capability and range with its unique configuration featuring low disc loading in hover and low drag in cruise. When wing-borne flight is desired some or all of the rotors can rotate downward so the thrust vector is in a horizontal plane.

The modular TTR is a unique configuration which can fly like a winged tandem helicopter in hover mode, then transitions like a tiltrotor to airplane-mode flight. The modular TTR can be structurally more efficient and lower drag than a conventional tiltrotor, has better control authority and lifting capacity than hybrid-quads and tail-sitters, and has more range than a helicopter or multi-rotor. The modular TTR can orbit and search over a broad area, or can hover for long periods, depending on the application. Instead of providing a multi-function TTR that is generally suited for all applications, but not optimized for any, the modular TTR allows for customized configuration for a particular application. For example, a hover application that requires long, efficient dwell time over a particular area, but not flight over a large area, can eliminate the wings, empennage, and landing gear of a modular TTR, for a stripped-down version with a landing skid. Alternatively, where a large swath of coverage is preferred, wings, empennage, and landing gear can be added to a modular TTR to aid its efficiency. Additionally, applications that fall between large area and single area applications can utilize a mid-range configuration where smaller inboard wings and an empennage can be implemented, but larger outboard wings can be jettisoned.

Several rotor configurations are contemplated:

A. "Traditional"—Both rotors are above the aircraft and when rotated downward the forward rotor begins to pull the aircraft forward. The aft rotor can either feather its rotor or have negative pitch capability such that it can assist in forward flight, feather its rotor or fold the rotor all together.

B. "Daisy Cutter"—One rotor is above the aircraft (generally the forward one) and the other is below pushing upward in hover. As the forward rotor rotates downward it will pull the aircraft forward. As the lower rotor rotates upward it will begin to push the aircraft forward as well.

C. "Bottom"—Both rotors positioned below the aircraft. When the forward rotor rotates upward it can have negative pitch capability, feather its rotor, or fold all together. When the aft rotor is rotated upward it will push the aircraft forward. This configuration could be preferred when docking with another aircraft or inspecting the underside of something.

D. "Augmented CG" or "Higher Gross Weight"—A rotor may be left in the vertical lift orientation while the other rotor provides forward propulsion. This would allow the aircraft to have a higher gross weight, allow for safer transitions at slow airspeeds where the wing may stall or allow for wider range of CGs.

E. Other configurations exist. More than two rotors can be used in series for instance; the key element of this design is that they are in series. Any combination of feathered, folded, or negative pitch rotors can be used.

The current disclosure describes an aircraft in which the tiltrotors are located at the forward and aft ends of the fuselage of the aircraft, thus eliminating the need for extra support in the wings of the aircraft and making the aircraft more efficient in horizontal flight, while still allowing the aircraft to have the vertical take-off and landing abilities of a traditional tiltrotor aircraft. Although not limited to pilotless aircraft, at least one embodiment of this disclosure would work well in such aircraft, as the entire forward end of the aircraft fuselage can be used to accommodate the forward end rotor assemblies, and therefore continue to increase the efficiency of the aircraft. The aircraft can also include a cargo bay to facilitate payload capabilities. The cargo bay can be configured with an electro-optic/infrared (EO/IR) gimble, a sensor array, deployable payloads, or with cargo.

In one exemplary embodiment, a modular tandem tiltrotor aircraft, includes: a fuselage having a forward end and an aft end; a forward rotor assembly operably coupled to the forward end of the fuselage and operably rotatable between a first position and a second position; an aft rotor assembly operably coupled to the aft end of the fuselage and operably rotatable between the first position and a second position; and a flight control computer configured to receive a unique identifier from one or more devices coupled to the flight control computer to determine a mode of operation. Wherein the first position disposes the rotor blades above the fuselage. Wherein the second position disposes the rotor blades in-line with the fuselage axis. Wherein the mode of operation is a tandem helicopter. Wherein the mode of operation is a tiltrotor. Wherein the flight control computer includes a built-in preflight check. Wherein the built-in preflight check determines the status or health of each component operably coupled to the flight control computer. Wherein the flight control computer retrieves system thresholds or values for the determined mode of operation. Wherein the flight control computer configures one or more system settings according to the retrieved thresholds or values. Further comprising a long-range flight assembly releasably coupled to the fuselage. Further comprising a mid-range flight assembly releasably coupled to the fuselage.

In another exemplary embodiment, a modular tandem tiltrotor aircraft, includes: a fuselage having a forward end and an aft end; a forward rotor assembly operably coupled to the forward end of the fuselage and rotatable to a plurality of positions; an aft rotor assembly operably coupled to the aft end of the fuselage and rotatable to a plurality of positions; a flight assembly releasably coupled to the fuselage; and a flight control computer configured to receive a unique identifier from one or more devices coupled to the flight control computer to determine a mode of operation. Wherein the flight assembly is a long-range flight assembly. Wherein the flight assembly is a mid-range flight assembly. Wherein the long-range flight assembly includes an inboard wing, an outboard wing, a tail boom, and an empennage. Wherein the mid-range flight assembly includes an inboard wing, a tail boom, and an empennage. Wherein the flight control computer includes a built-in preflight check. Wherein the built-in preflight check determines the status or health of each device operably coupled to the flight control computer. Wherein the flight control computer determines the mode of operation based on a status of devices connected to the flight control computer. Wherein the FCC configures one or more system settings according to retrieved thresholds or values.

BRIEF DESCRIPTION OF THE DRAWINGS

FIG. 2 is a flowchart describing the transition of a tandem tiltrotor aircraft arranged in a traditional configuration to forward flight, in accordance with an embodiment of the present disclosure;

DETAILED DESCRIPTION

The preferred version of the invention presented in the following written description and the various features and advantageous details thereof are explained more fully with reference to the non-limiting examples included in the accompanying drawings and as detailed in the description which follows. Descriptions of well-known components and are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
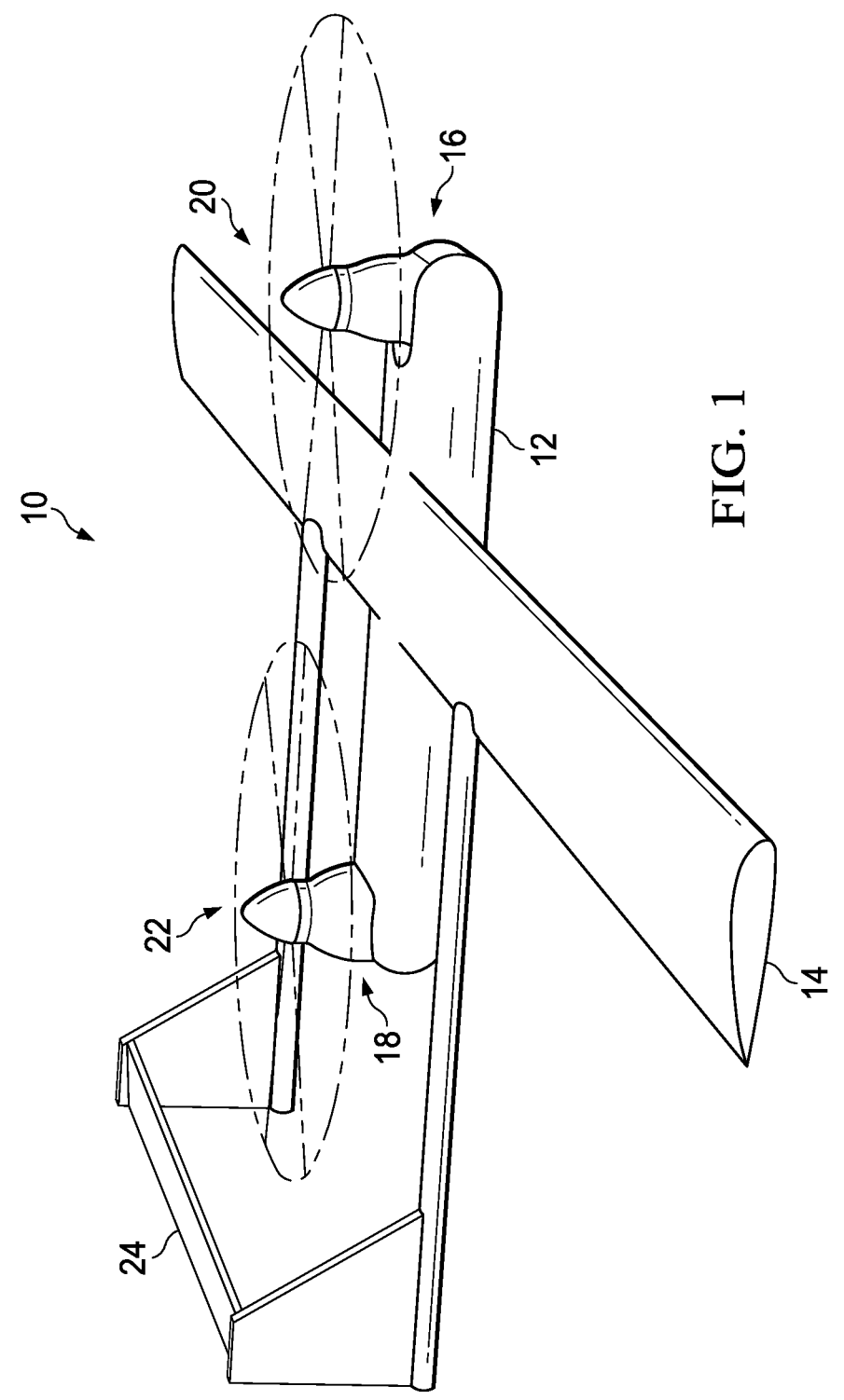
FIG. 1 is a perspective view of a tandem tiltrotor aircraft arranged in a traditional configuration, in accordance with an embodiment of the present disclosure.

FIG. 1 is a perspective view of tandem tiltrotor aircraft, designated generally as 10, in accordance with an embodiment of the present disclosure. The tandem tiltrotor aircraft 10 includes a fuselage 12, a forward rotor assembly 16, an aft rotor assembly 18, a wing 14, and a horizontal stabilizer 24. The fuselage 12 can be an elongated member such that it extends from an aft end to a forward end, along a fuselage axis. The aircraft 10, is preferably an Unmanned Aerial Vehicle (UAV), but can be manned. The forward rotor assembly 16 can be operably coupled to the forward end of the fuselage 12, along the fuselage axis. Then aft rotor assembly 18 can be operably coupled to the aft end of the fuselage, along the fuselage axis. The wing 14 can be configured to provide lift for sustained horizontal flight and can be operably coupled to the fuselage at a point between the aft end and forward end of the fuselage 12.

Both the forward rotor assembly 16 and the aft rotor assembly 18 are configured to be rotatably positioned between a vertical lift position and a horizontal flight positon. In a preferred embodiment, each rotor assembly 16 or 18 can be configured to rotate in-line with the fuselage axis, or orthogonal to the fuselage axis. The vertical lift position for each rotor assembly 16 or 18 being a position in which the rotor assembly can be aligned substantially vertically, and the horizontal flight position for each rotor assembly being a position in which the rotor faces substantially horizontally. The forward rotor assemblies 16 and 18 are aligned substantially vertically if they can lift the fuselage from the ground, independently or in concert. The rotor assemblies 16 and 18 are aligned substantially horizontally, if they can move the fuselage horizontally along the fuselage axis, independently or in concert. Each rotor assembly 16 or 18 can be configured to be operable for propulsion as they rotate between the lift and horizontal flight positions. Further, each rotor assembly 16 or 18 can be configured to stop at any selected location along its rotation between the lift and flight positions and continue propulsion operation at that selected location.

The rotor assemblies 16, 18 are not limited to any specific design. The embodiments disclose any type of rotor assembly used or potentially used in the propulsion of aircraft. In one embodiment, the rotors assemblies 16 and 18 can be propeller type rotors, the forward rotor assembly 16 comprising a plurality of propeller blades 20, the aft rotor assembly 18 comprising a plurality of propeller blades 22.

In one embodiment of the disclosure, the aircraft 10 can be configured for vertical lift. The vertical lift position for the forward rotor assembly 16 can be configured such that the forward rotor assembly can be aligned substantially vertically (in an upward-facing vertical position). The vertical lift position for the aft rotor assembly 18 can be configured such that the aft rotor assembly can be aligned in an upward-facing vertical position (substantially vertically). This embodiment can be referred to as a "traditional" configuration. As discussed above, the rotor assemblies 16 or 18 can be any type of rotor assembly suitable for the propulsion of aircraft. In one embodiment, the rotor assemblies 16 and 18 can be propeller type rotors, the plurality of propeller blades 20 and 22 can be configured to have a positive pitch angle, such that as the rotor assemblies 16 or 18 provide thrust for aircraft 10 propulsion, the plurality of propeller blades 20 and 22 operate to "pull" aircraft 10 off of the ground substantially vertically, into the air. Rotor assemblies that work to "pull" aircraft are commonly referred to as "puller rotors," as the rotation of the propeller blades create a thrust away from a payload.

Figure 7A:
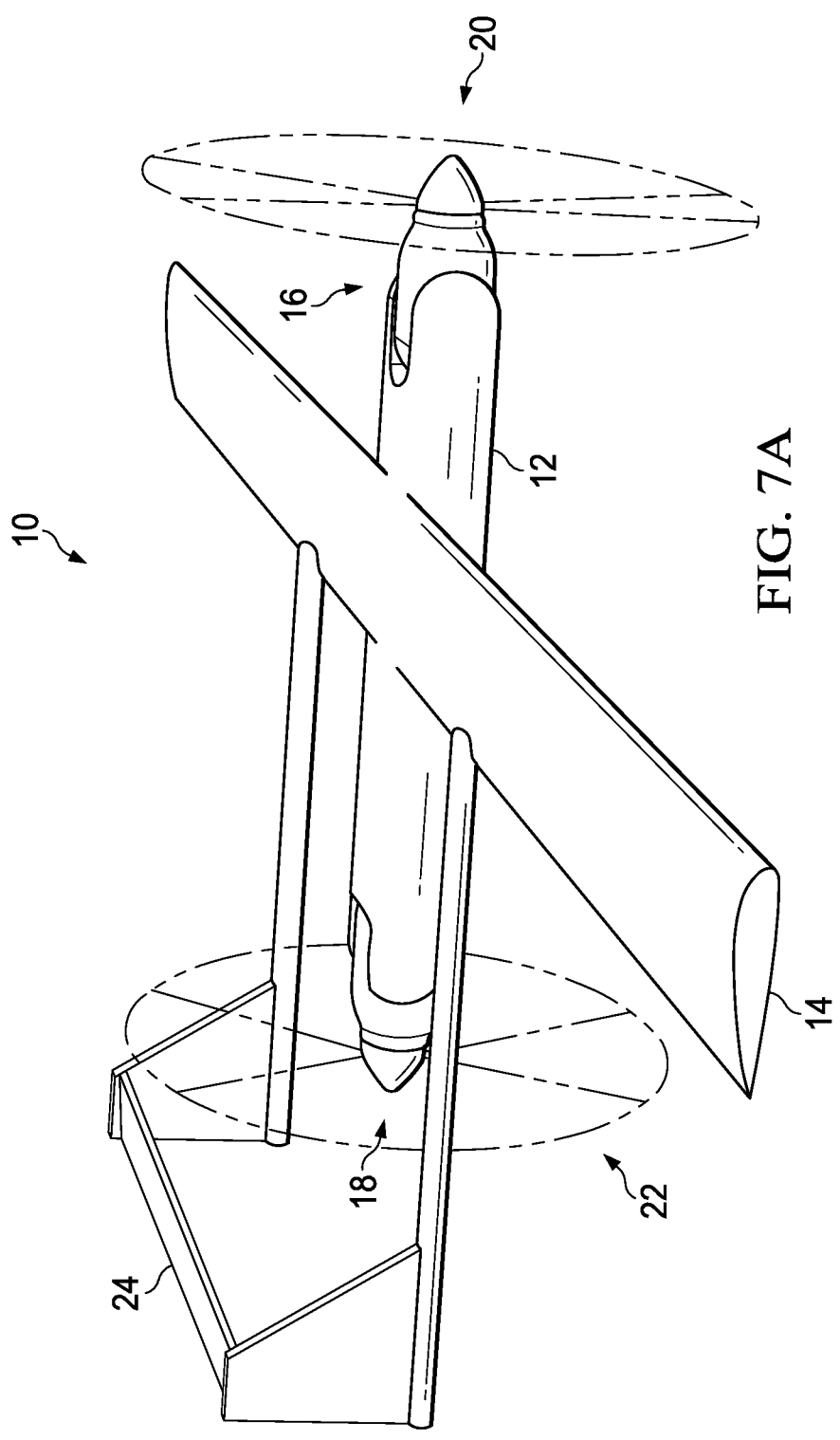
FIG. 7A is a perspective view of a tandem tiltrotor aircraft arranged in a dual rotor horizontal flight configuration, in accordance with an embodiment of the present disclosure.

FIG. 2 is a flowchart of a method 100 for transitioning the aircraft 10 from a traditional configuration disclosed in FIG. 1 to a dual-rotor horizontal flight configuration disclosed in FIG. 7A. The FIG. 2 flowchart describes the steps taken by the aft rotor assembly 18 on the left side of the flowchart, and the forward rotor assembly 16 on the right side of the flowchart. Each step can be executed by the rotor assemblies 16 and 18 simultaneously, sequentially, suitable delay, or other suitable initiation. The method begins at 102, where the aft rotor assembly 18 can be in a vertical lift position, which can be an upward-facing vertical position, the aft rotor assembly can be configured to be a puller rotor. At 102 the forward rotor assembly 16 can be in a vertical lift position, which can be an upward-facing vertical position, the forward rotor assembly can be configured to be a puller rotor. The method then proceeds to 104.

At 104, both rotor assemblies 16, 18 can be configured to begin propulsion operation. The method then proceeds to 106.

At 106, the aircraft 10 can achieve vertical lift due to the propulsion operation of the rotor assemblies 16, 18 in their respective vertical lift positions. The method then proceeds to 108.

At 108, the aft rotor assembly 18 can continue propulsion operation in a vertical lift position as a puller rotor. The forward rotor assembly 16 can begin to rotate to its horizontal flight position, which can be a substantially horizontal (forward-facing) position, and continue propulsion operation as a puller rotor. The method then proceeds to 110.

At 110, the aircraft 10 begins to travel in the horizontal direction, due to the forward rotor assembly 16 beginning to rotate to its horizontal flight position. The method then proceeds to 112.

At 112, the forward rotor assembly 16 reaches its horizontal flight position, and continues propulsion operation as a puller rotor. At this point, with the forward rotor assembly 16 in its horizontal flight position working as a puller rotor and the aft rotor assembly 18 in its vertical lift position working in as a puller rotor, the aft augmented lift horizontal flight configuration of FIG. 7D is achieved. At step 112, the aft rotor assembly 18 is further configured to stop propulsion operation, therefore becoming idle. The propeller blades 20 can optionally be folded parallel to the nacelle and subsequently locked. In one embodiment the aft rotor assembly 18 can be a propeller type rotor, the plurality of propeller blades 22 of the rotor assembly configured to adjust to a feathered pitch angle, so as to reduce the amount of drag produced by the propeller blades. The method then proceeds to 114.

At 114, the aircraft 10 achieves horizontal flight, the only vertical lift of the aircraft being produced by the aircraft wings 14. The method then proceeds to 116.

At 116, the aft rotor assembly 18, in an idle state, begins to rotate to its horizontal flight position, which is a backward-facing position. The forward rotor assembly 16 continues propulsion operation as a puller rotor. The method then proceeds to 118.

At 118, the aft rotor assembly 18 reaches its horizontal flight position. At this point, with the aft rotor assembly 18 in an idle state in its horizontal flight position and the forward rotor assembly working as a puller rotor in its horizontal flight position, the aircraft 10 has achieved the forward rotor horizontal flight configuration disclosed in FIG. 7B. The aft rotor assembly 18 can be further configured to operate as a as a pusher rotor. In one embodiment the aft rotor assembly 18 is a propeller type rotor, the plurality of propeller blades 22 of the rotor assembly can be configured to have a negative pitch angle, making the aft rotor assembly a pusher rotor. At 118, the forward rotor assembly 16 continues propulsion operation as a puller rotor. The method then proceeds to 120.

At 120, the aft rotor assembly 18 begins propulsion operation as a pusher rotor. The forward rotor assembly 16 continues propulsion operation as a puller rotor. The method then proceeds to 122.

At 122, the aircraft 10 achieves horizontal flight with both rotors 16, 18 providing propulsion in their respective horizontal flight positions, as disclosed in FIG. 7A.

It will be understood by those skilled in the art that the rotor assemblies 16, 18 are configured to transition back to their respective vertical lift positions disclosed in FIG. 1 from their respective horizontal flight positions in a process opposite of the process disclosed in the relevant preceding paragraphs and FIG. 2.

Figure 3:
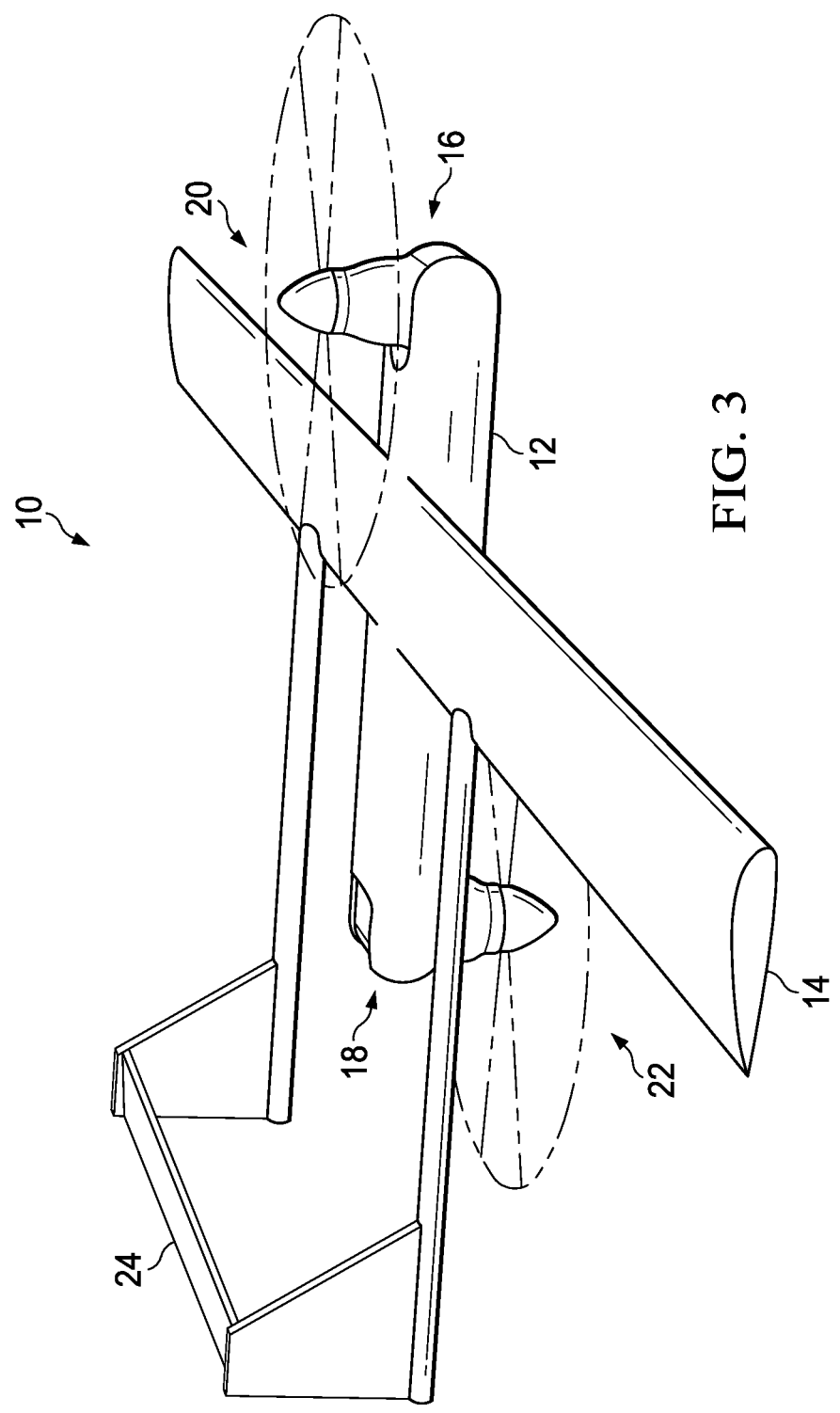
FIG. 3 is a perspective view of a tandem tiltrotor aircraft arranged in a daisy cutter configuration, in accordance with an embodiment of the present disclosure.

Referring to FIG. 3, in one embodiment of this disclosure, the aircraft 10 is configured for vertical lift. The vertical lift position for the forward rotor assembly 16 is configured such that the forward rotor assembly is in an upward-facing vertical position. The vertical lift position for the aft rotor 18 assembly is configured such that the aft rotor assembly is in a downward-facing vertical position. This embodiment is referred to as a "daisy cutter" configuration. As previously disclosed, the rotor assemblies 16, 18 can be any type of rotor assembly used or potentially used in the propulsion of aircraft. In one embodiment, the rotor assemblies 16, 18 are propeller type rotors, the plurality of propeller blades 20 of the forward rotor assembly 16 configured to have a positive pitch angle, such that as the forward rotor assembly spins in propulsion operation, the plurality of propeller blades work to "pull" aircraft 10 off of the ground vertically into the air. Rotor assemblies that work to "pull" aircraft are commonly referred to as "puller rotors." The plurality of propeller blades 22 of the aft rotor assembly 18 are configured to have negative pitch angles, such that as the aft rotor assembly spins in propulsion operation, the plurality of propeller blades work to "push" the aircraft 10 off of the ground vertically into the air. Rotor assemblies that work to "push"

aircraft are commonly referred to as "pusher rotors," as the rotation of the propeller blades create a thrust toward a payload.

Figure 4:
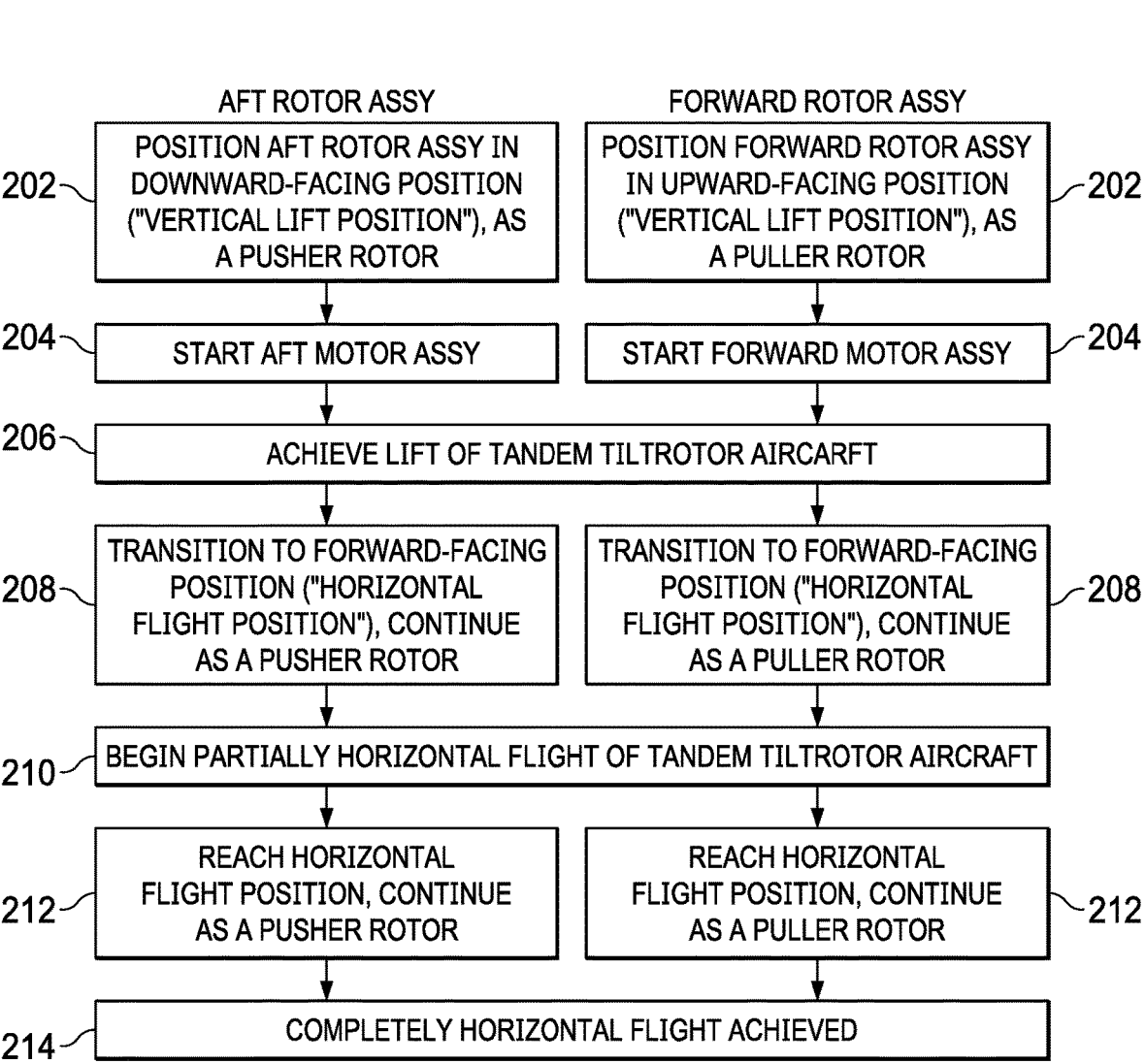
FIG. 4 is a flowchart describing the transition of a tandem tiltrotor aircraft arranged in a daisy cutter configuration to forward flight, in accordance with an embodiment of the present disclosure.

FIG. 4 is a flowchart of a method 200 for transitioning the aircraft 10 from a daisy cutter configuration disclosed in FIG. 3 to a dual rotor horizontal flight configuration disclosed in FIG. 7A. The FIG. 4 flowchart describes the steps taken by the aft rotor assembly 18 on the left side of the flowchart, and the forward rotor assembly 16 on the right side of the flowchart. Each step can be executed by the rotor assemblies 16 and 18 simultaneously, sequentially, suitable delay, or other suitable initiation. The method begins at 202, where the aft rotor assembly 18 is in its vertical lift position, which is a downward-facing position, the aft rotor assembly configured to be a pusher rotor. At 202 the forward rotor assembly 16 is in its vertical lift position, which is an upward-facing position, the forward rotor assembly configured to be a puller rotor. The method then proceeds to 204.

At 204, both rotor assemblies 16, 18 are configured to begin propulsion operation. The method then proceeds to 206.

At 206, the aircraft 10 achieves vertical lift due to the propulsion operation of the rotor assemblies 16, 18 in their respective vertical lift positions. The method then proceeds to 208.

At 208, the aft rotor assembly 18 begins to rotate to its horizontal flight position, which is a backward-facing position, and continues propulsion operation as a pusher rotor. The forward rotor assembly 16 begins to rotate to its horizontal flight position, which can be a substantially horizontal (forward-facing) position, and continues propulsion operation as a puller rotor. The method then proceeds to 210.

At 210, the aircraft 10 begins to travel in the horizontal direction, due to the rotor assemblies 16, 18 beginning to rotate to their respective horizontal flight position. The method then proceeds to 212.

At 212, the aft rotor assembly 18 reaches its horizontal flight position, and continues propulsion operation as a pusher rotor. The forward rotor assembly 16 reaches its horizontal flight position, and continues propulsion operation as a puller rotor. The method then proceeds to 214.

At 214, the aircraft 10 achieves horizontal flight with both rotors 16, 18 providing propulsion in their respective horizontal flight positions, as disclosed in FIG. 7A.

It will be understood by those skilled in the art that the rotor assemblies 16, 18 are configured to transition back to their respective vertical lift positions disclosed in FIG. 3 from their respective horizontal flight positions in a process opposite of the process disclosed in the relevant preceding paragraphs and FIG. 4.

Figure 5:
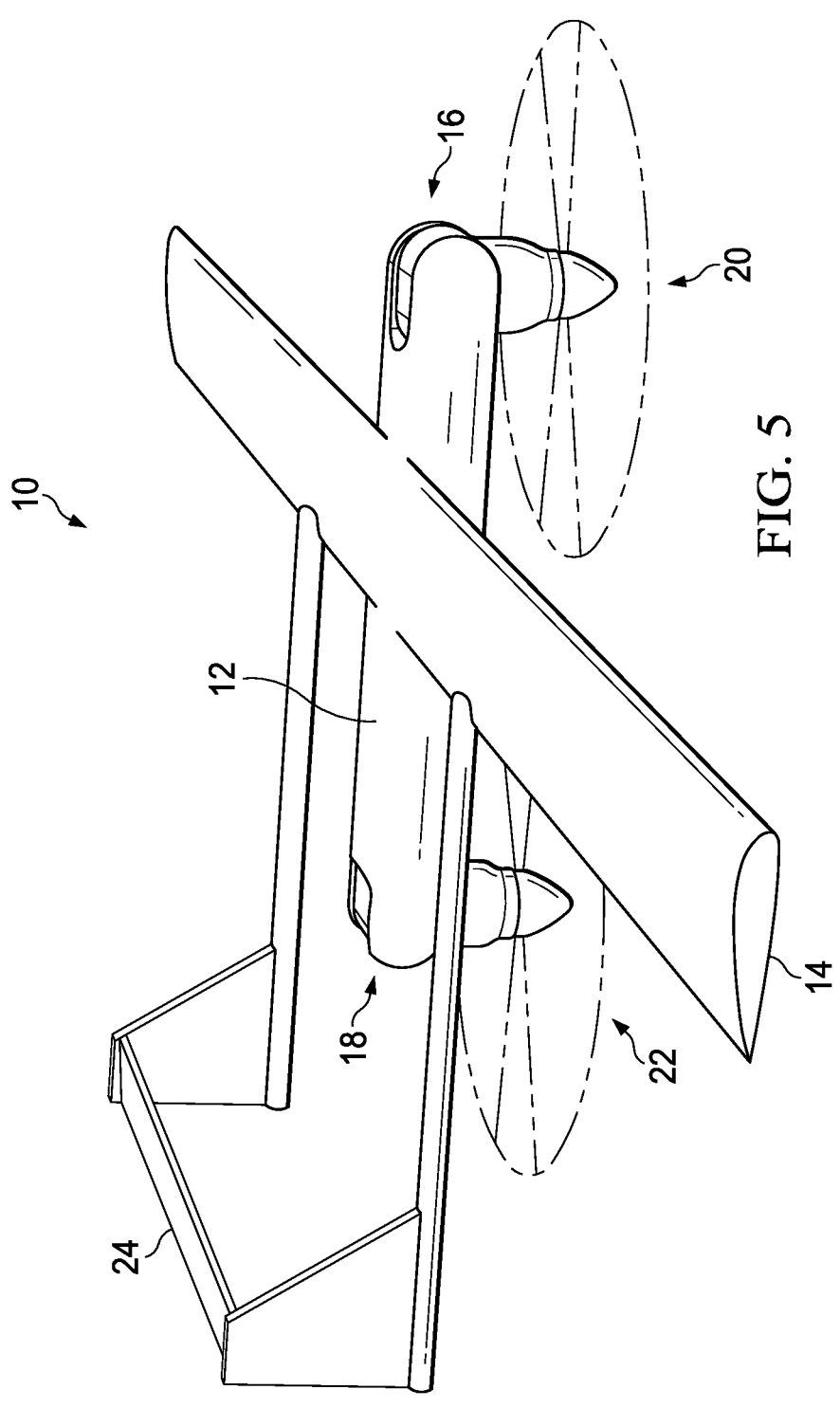
FIG. 5 is a perspective view of a tandem tiltrotor aircraft arranged in a bottom configuration, in accordance with an embodiment of the present disclosure.

Referring to FIG. 5, in one embodiment of this disclosure, the aircraft 10 is configured for vertical lift. The vertical lift position for the forward rotor assembly 16 is configured such that the forward rotor assembly is in a downward-facing vertical position. The vertical lift position for the aft rotor assembly 18 can be configured such that the aft rotor assembly is in a downward-facing vertical position. This embodiment can be referred to as a "bottom" configuration. As previously disclosed, the rotor assemblies 16, 18 can be any type of rotor assembly used or potentially used in the propulsion of aircraft. In one embodiment, the rotor assemblies 16, 18 are propeller type rotors, the plurality of propeller blades 20, 22 of each of the rotor assemblies configured to have a negative pitch angle, such that as the rotor assemblies 16, 18 spin in propulsion operation, the plurality of propeller blades 20, 22 work to "push" aircraft 10 off of the ground vertically into the air. Rotor assemblies that work to "push" the aircraft are commonly referred to as "pusher rotors."

Figure 6:
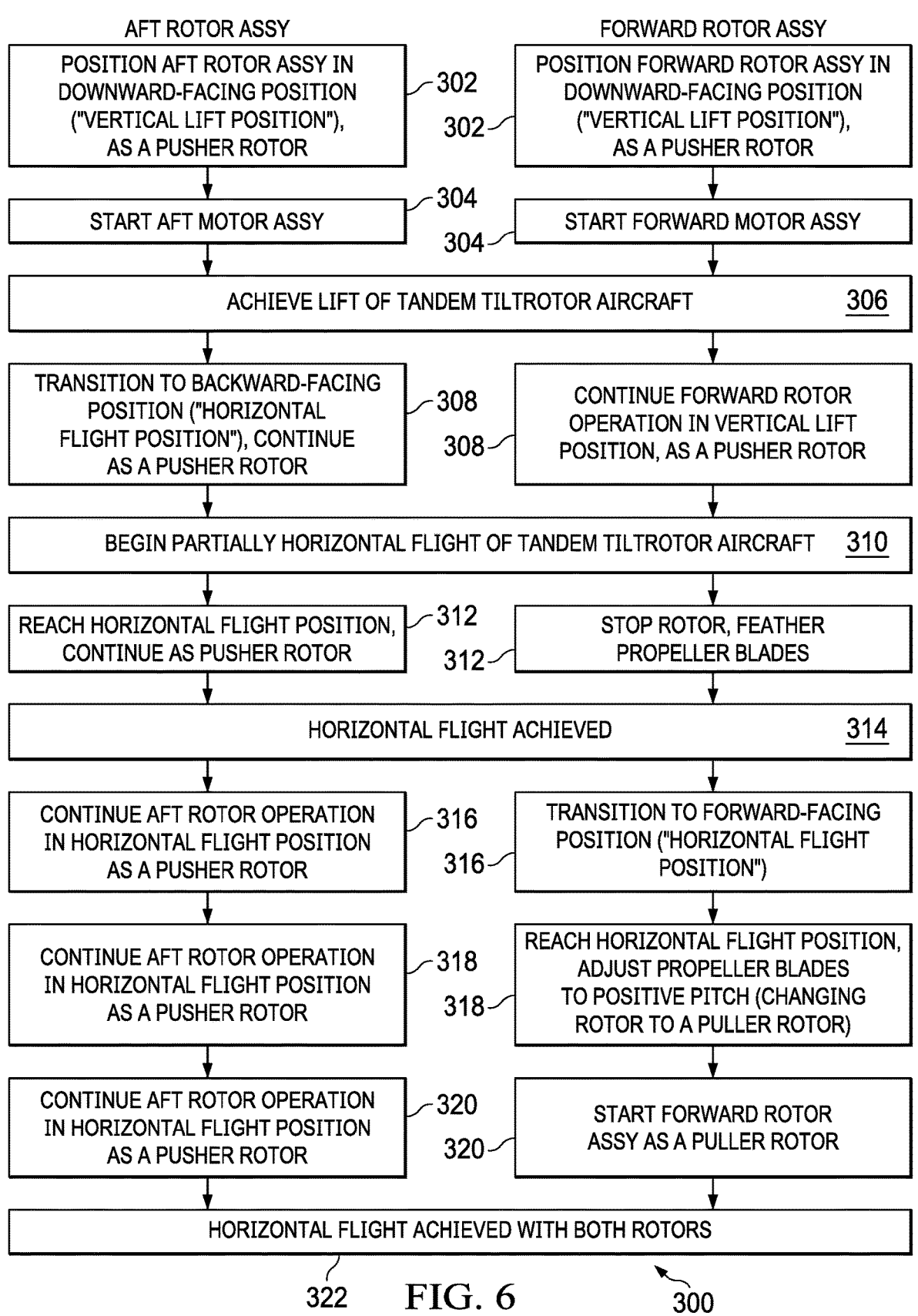
FIG. 6 is a flowchart describing the transition of a tandem tiltrotor aircraft arranged in a bottom configuration to forward flight, in accordance with an embodiment of the present disclosure.

FIG. 6 is a flowchart of a method 300 for transitioning the aircraft 10 from a "bottom" configuration disclosed in FIG. 1 to a dual rotor horizontal flight configuration disclosed in FIG. 7A. The FIG. 6 flowchart describes the steps taken by the aft rotor assembly 18 on the left side of the flowchart, and the forward rotor assembly 16 on the right side of the flowchart. Each step can be executed by the rotor assemblies 16 and 18 simultaneously, sequentially, suitable delay, or other suitable initiation. The method begins at 302, where the aft rotor assembly 18 is in its vertical lift position, which is a downward-facing position, the aft rotor assembly configured to be a pusher rotor. At 302 the forward rotor assembly 16 is in its vertical lift position, which can be a downward-facing position, the forward rotor assembly configured to be a pusher rotor. The method then proceeds to 304.

At 304, both rotor assemblies 16, 18 are configured to begin propulsion operation. The method then proceeds to 306.

At 306, the aircraft 10 achieves vertical lift due to the propulsion operation of the rotor assemblies 16, 18 in their respective vertical lift positions. The method then proceeds to 308.

At 308, the forward rotor assembly 16 continues propulsion operation in its vertical lift position as a pusher rotor. The aft rotor assembly 18 begins to rotate to its horizontal flight position, which is a backward-facing position, and continues propulsion operation as a pusher rotor. The method then proceeds to 310.

At 310, the aircraft 10 begins to travel in the horizontal direction, due to the aft rotor assembly 18 beginning to rotate to its horizontal flight position. The method then proceeds to 312.

At 312, the aft rotor assembly 18 reaches its horizontal flight position, and continues propulsion operation as a pusher rotor. At this point, with the forward rotor assembly 16 in its vertical lift position working as a pusher rotor and the aft rotor assembly 18 in its horizontal flight position working in as a pusher rotor, the forward augmented lift horizontal flight configuration of FIG. 7E is achieved. At 312, the forward rotor assembly 16 can be further configured to stop propulsion operation, therefore becoming idle. In one embodiment the forward rotor assembly 16 is a propeller type rotor, the plurality of propeller blades 20 of the rotor assembly configured to adjust to a feathered pitch angle, so as to reduce the amount of drag produced by the propeller blades. The propeller blades 20 can optionally be folded parallel to the nacelle and subsequently locked. The method then proceeds to 314.

At 314, the aircraft 10 achieves horizontal flight, the only vertical lift of the aircraft being produced by the aircraft wings 14. The method then proceeds to 316.

At 316, the forward rotor assembly 16, in an idle state, begins to rotate to its horizontal flight position, which can be a substantially horizontal (forward-facing) position. The aft rotor assembly 18 continues propulsion operation as a pusher rotor. The method then proceeds to 318.

At 318, the forward rotor assembly 16 reaches its horizontal flight position. At this point, with the forward rotor assembly 16 in an idle state in its horizontal flight position, and the aft rotor assembly working as a pusher rotor in its horizontal flight position, the aircraft 10 has achieved the aft rotor horizontal flight configuration disclosed in FIG. 7C. The forward rotor assembly 16 is further configured to operate as a as a puller rotor. In one embodiment, the forward rotor assembly 16 is a propeller type rotor, the plurality of propeller blades 20 of the rotor assembly configured to adjust to have a positive pitch angle, making the forward rotor assembly a puller rotor. At 318, the aft rotor assembly 18 continues propulsion operation as a pusher rotor. The method then proceeds to 320.

At 320, the forward rotor assembly 16 begins propulsion operation as a puller rotor. The aft rotor assembly 18 continues propulsion operation as a pusher rotor. The method then proceeds to 322.

At 322, the aircraft 10 achieves horizontal flight with both rotors 16, 18 providing propulsion in their respective horizontal flight positions, as disclosed in FIG. 7A.

It will be understood by those skilled in the art that the rotor assemblies 16, 18 are configured to transition back to their respective lift positions disclosed in FIG. 5 from their respective horizontal flight positions in a process opposite of the process disclosed in the relevant preceding paragraphs and FIG. 6.

All of the previously disclosed embodiments have described an aircraft 10 configured to rotate forward and aft rotor assemblies 16, 18 between a vertical lift and a horizontal flight position, the vertical lift and horizontal flight positions generally being approximately ninety degrees apart. However, it is understood that the disclosure is not limited to rotor assemblies 16, 18 rotatable only to approximately ninety degrees. There are contemplated embodiments of this disclosure in which the rotor assemblies 16, 18 are rotatable up to approximately 180 degrees. In these embodiments, the rotor assemblies 16, 18 can be configured to start and stop operation according to the desired results of the aircraft 10, in accordance with the prior disclosure. In these embodiments, the plurality of propeller blades 20, 22 of their respective rotor assemblies 16, 18, are configured to adjust their pitch direction according to the desired result of the aircraft 10, in accordance with the prior disclosure.

Figure 7B:
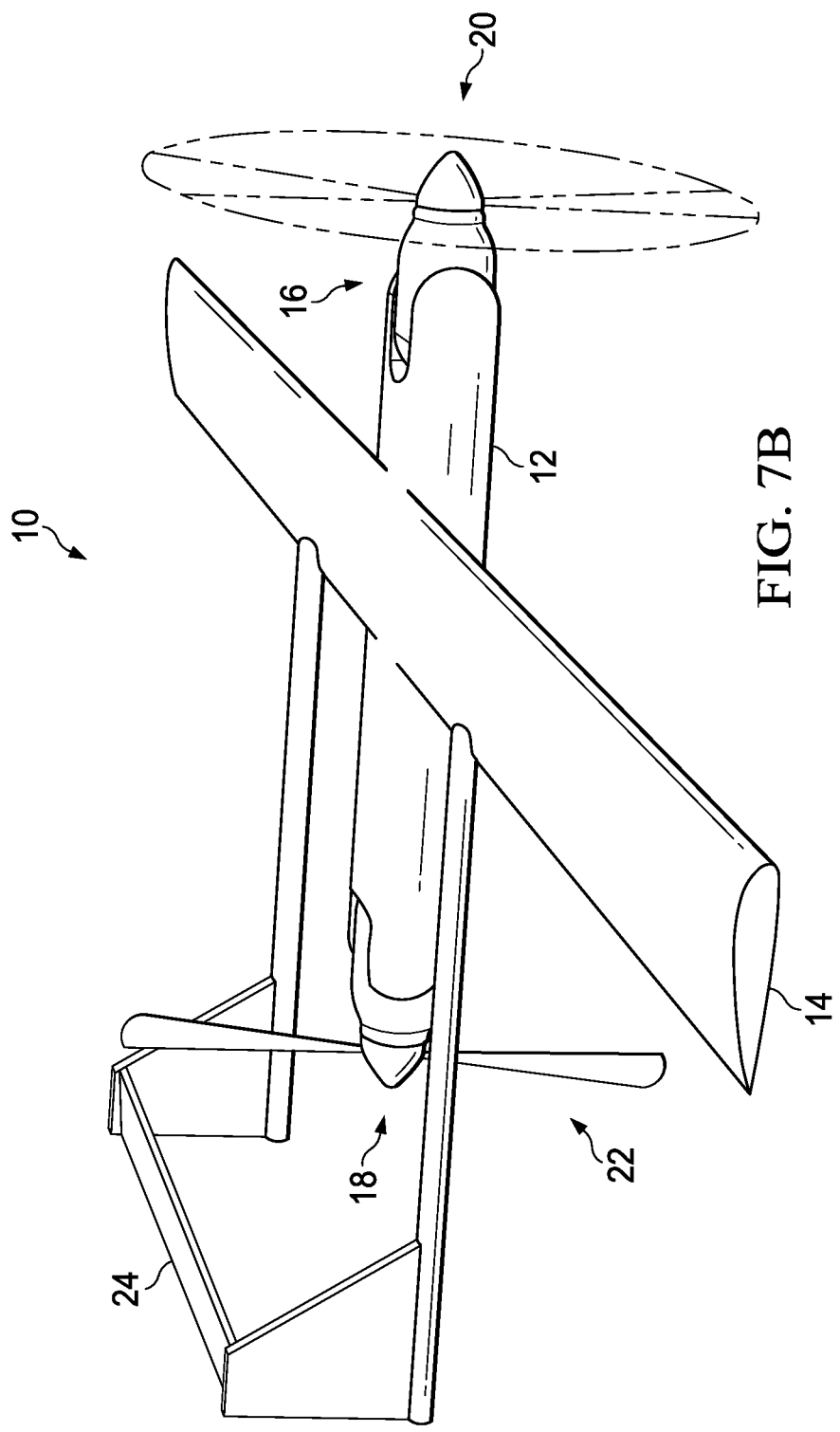
FIG. 7B is a perspective view of a tandem tiltrotor aircraft arranged in a forward rotor horizontal flight configuration, in accordance with an embodiment of the present disclosure.
Figure 7C:
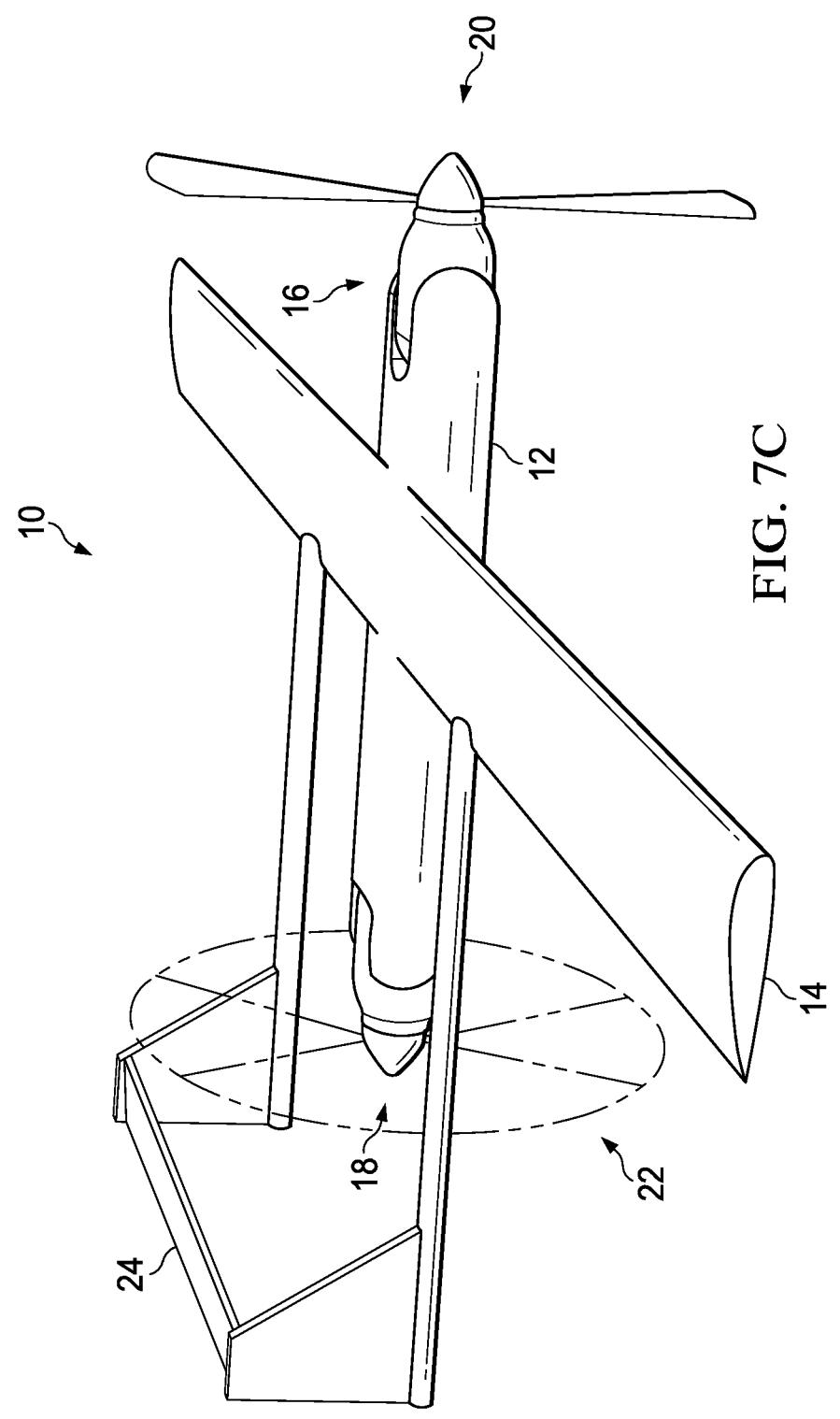
FIG. 7C is a perspective view of a tandem tiltrotor aircraft arranged in an aft rotor horizontal flight configuration, in accordance with an embodiment of the present disclosure.
Figure 7D:
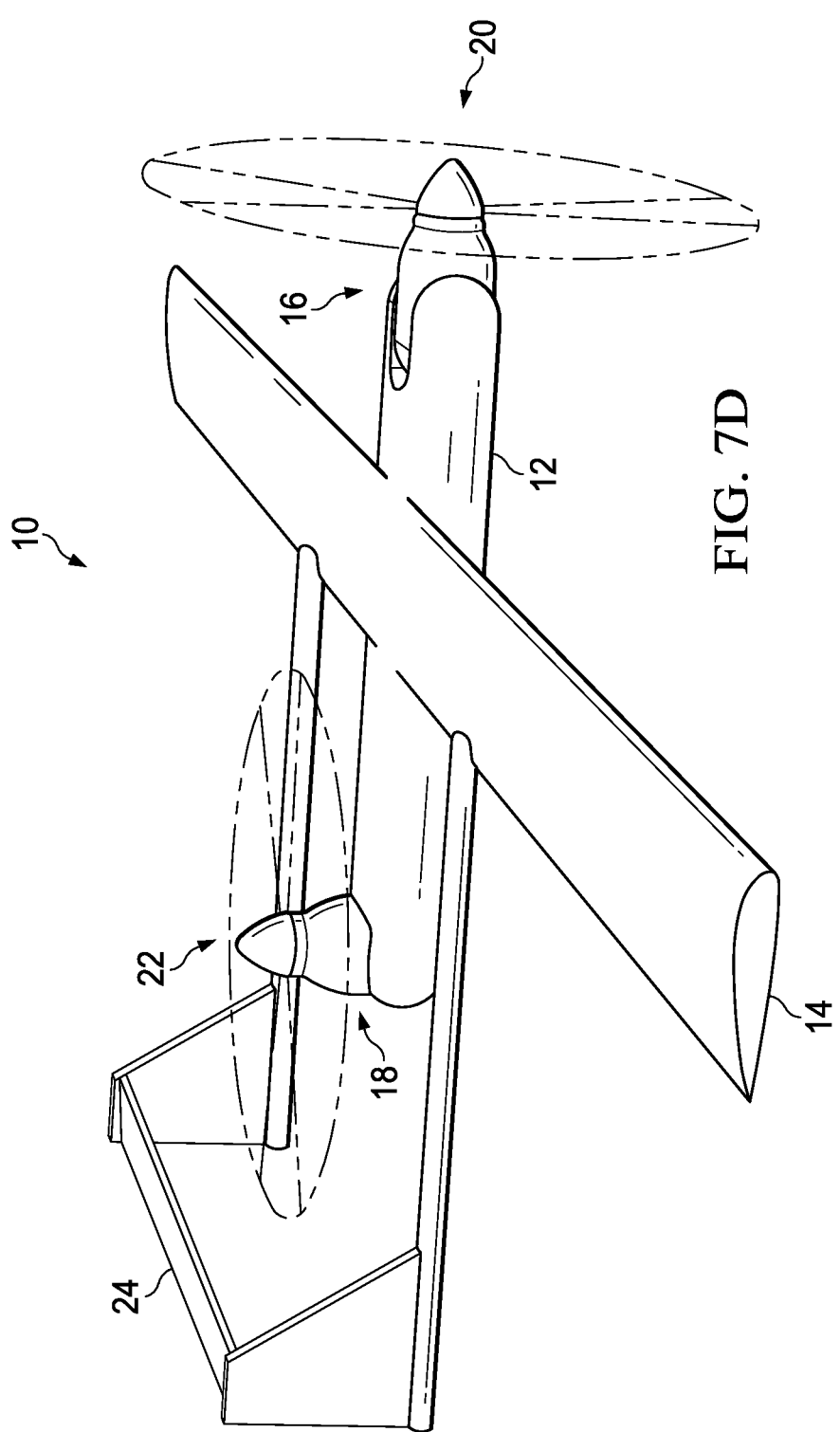
FIG. 7D is a perspective view of a tandem tiltrotor aircraft arranged in an aft augmented lift horizontal flight configuration, in accordance with an embodiment of the present disclosure.
Figure 7E:
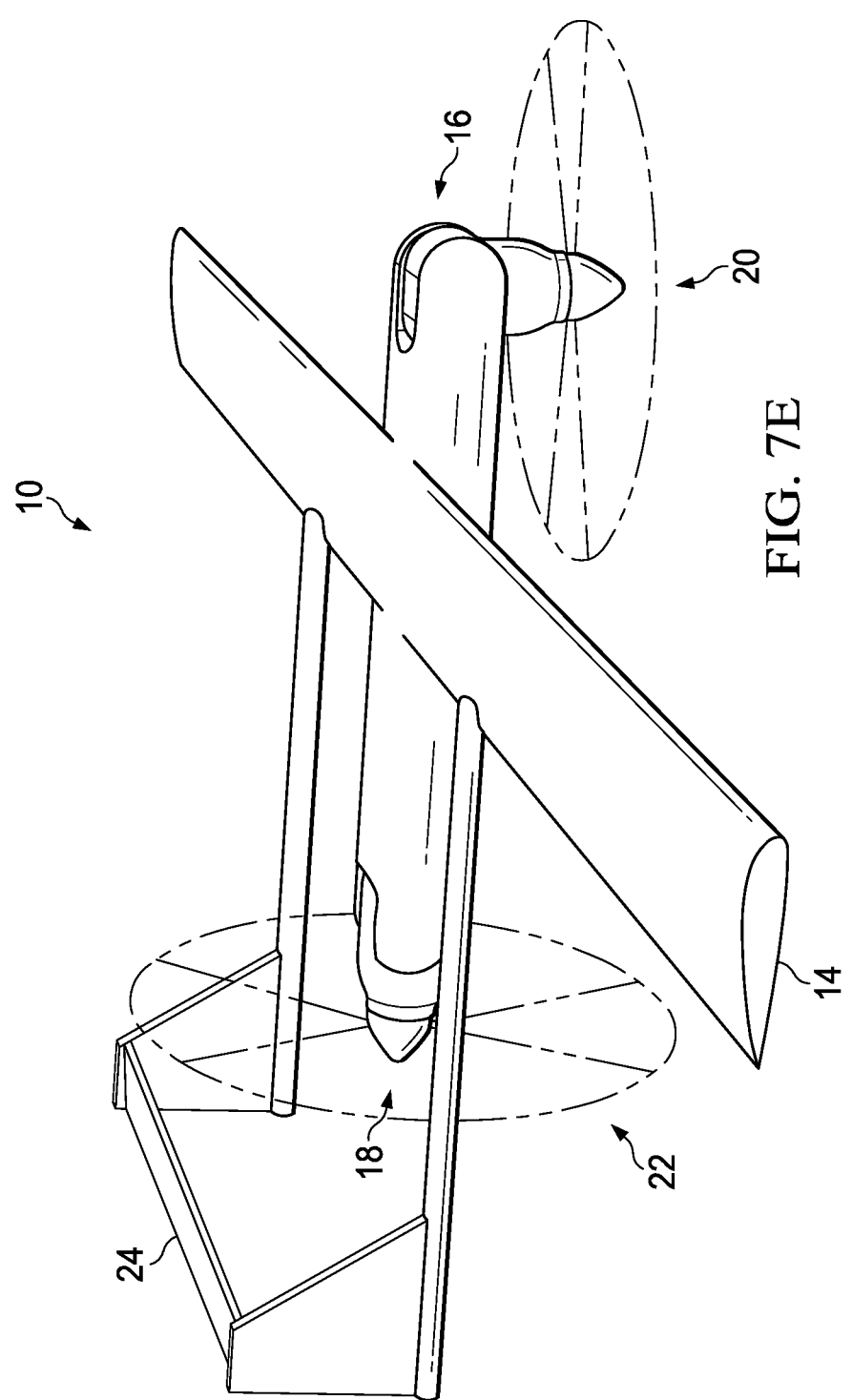
FIG. 7E is a perspective view of a tandem tiltrotor aircraft arranged in an augmented lift horizontal flight configuration, in accordance with an embodiment of the present disclosure.

FIGS. 7A-7E disclose perspective views of a tandem tiltrotor aircraft arranged various flight configurations, in accordance with various embodiments of the present disclosure. FIG. 7A is a perspective view of a tandem tiltrotor aircraft arranged in a dual rotor horizontal flight configuration, in accordance with an embodiment of the present disclosure. FIG. 7B is a perspective view of a tandem tiltrotor aircraft arranged in a forward rotor horizontal flight configuration, in accordance with an embodiment of the present disclosure. FIG. 7C is a perspective view of a tandem tiltrotor aircraft arranged in an aft rotor horizontal flight configuration, in accordance with an embodiment of the present disclosure. FIG. 7D is a perspective view of a tandem tiltrotor aircraft arranged in an aft augmented lift horizontal flight configuration, in accordance with an embodiment of the present disclosure. FIG. 7E is a perspective view of a tandem tiltrotor aircraft arranged in an augmented lift horizontal flight configuration, in accordance with an embodiment of the present disclosure.

Figure 8:
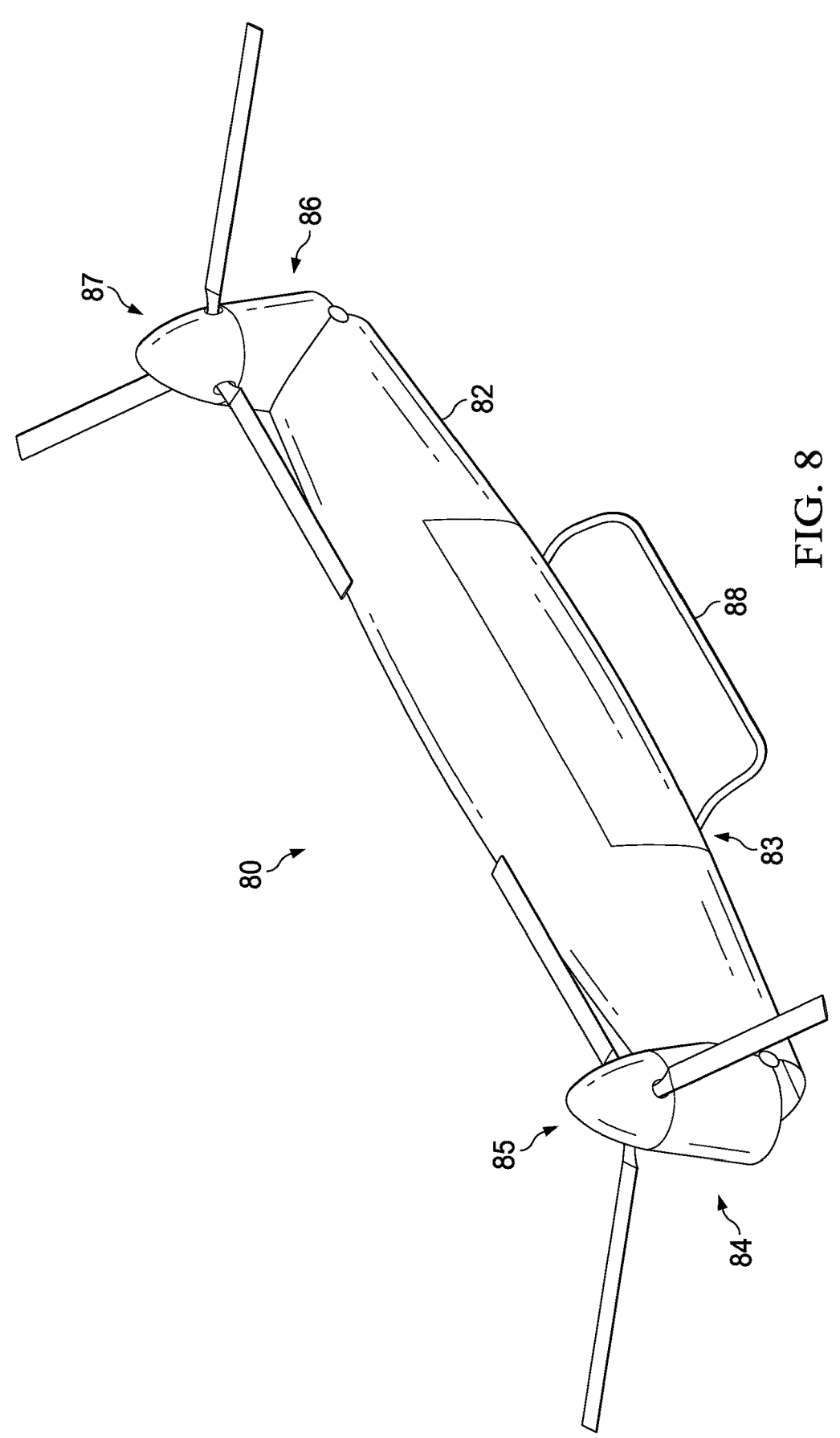
FIG. 8 is a perspective view of a modular tandem tiltrotor aircraft arranged in a heavy lift configuration, in accordance with an embodiment of the present disclosure.

FIG. 8 is a perspective view of a modular tandem tiltrotor aircraft (Modular TTR), designated generally as 80, arranged in a heavy lift configuration, in accordance with an embodiment of the present disclosure. The Modular TTR 80 configured with a customized configuration for a particular application via its implementation (or not) of modular components. For example, hover applications requiring long dwell times over a particular area, can perform better than those with wings and an empennage, due to weight considerations that can add strain to the rotors.

The Modular TTR 80 can include a fuselage 82, a forward rotor assembly 84, a plurality of propeller blades 85 of the forward rotor assembly 84, an aft rotor assembly 86, a plurality of propeller blades 87 of the aft rotor assembly 86, a cargo area (bay) 83, and landing gear 88. The fuselage 82 can be an elongated member such that it extends from an aft end to a forward end, along a fuselage axis. The aircraft or Modular TTR 80, is preferably an Unmanned Aerial Vehicle (UAV), but can be manned. The forward rotor assembly 84 can be operably coupled to the forward end of the fuselage 82, along the fuselage axis. The aft rotor assembly 86 can be operably coupled to the aft end of the fuselage 82, along the fuselage axis.

Both the forward rotor assembly 84 and the aft rotor assembly 86 can be configured to be rotatably positioned between a vertical lift position and a horizontal flight position. In one exemplary embodiment, each rotor assembly 84 or 86 can be configured to rotate in-line with the fuselage axis, or orthogonal to the fuselage axis. The vertical lift position for each rotor assembly 84 or 86 can be a position in which the rotor assembly can be aligned substantially vertically, and the horizontal flight position for each rotor assembly being a position in which the rotor faces substantially horizontally. The rotor assemblies 84 and 86 can be aligned substantially vertically to lift the fuselage from the ground, either independently or in concert. The rotor assemblies 84 and 86 can be aligned substantially horizontally, to move the fuselage horizontally along the fuselage axis, either independently or in concert. Each rotor assembly 84 or 86 can be configured to be operable for propulsion as they rotate between the lift and horizontal flight positions. Further, each rotor assembly 84 or 86 can be configured to stop at any selected position along its rotation between the lift and flight positions and continue propulsion operation at that selected position.

Figure 9:
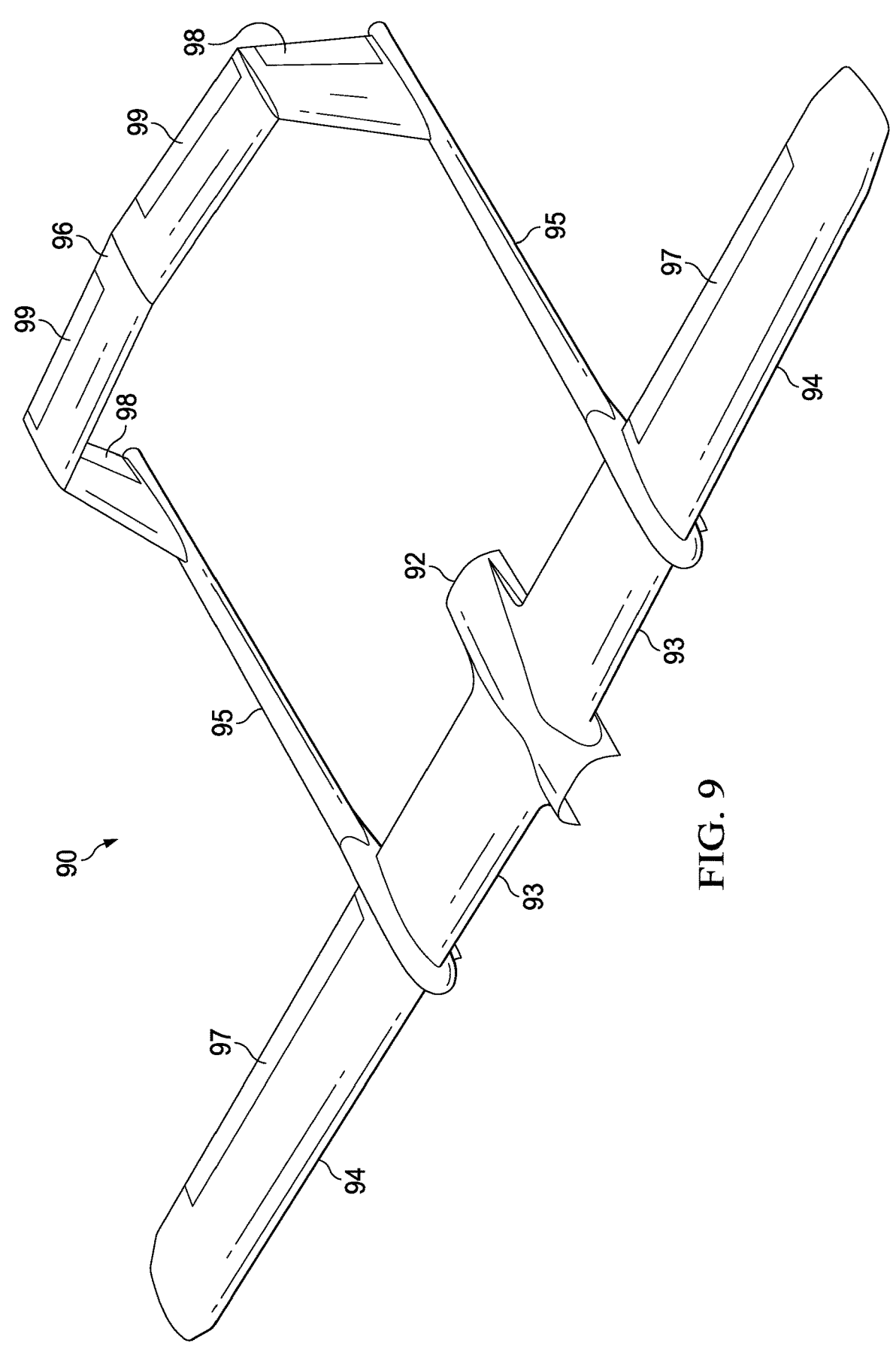
FIG. 9 is a perspective view of the long-range flight assembly for a modular tandem tiltrotor aircraft, in accordance with an embodiment of the present disclosure.

FIG. 9 is a perspective view of the long-range flight assembly, designated generally as 90, for a modular tandem tiltrotor aircraft, in accordance with an embodiment of the present disclosure. In one exemplary embodiment, the long-range flight assembly can include one or more modules, such as a fuselage attachment member 92, an inboard wing 93, an outboard wing 94, a tail boom 95, and an empennage 96. In another exemplary embodiment, the Modular TTR 80 can be configured to include one or more modules on either side of the fuselage 82. In another exemplary embodiment, the modules are selected based on the particular application for the Modular TTR 80.

In another exemplary embodiment, the modules (components) can be made of metal or composite material. In another exemplary embodiment, the modules can be made of similar or different types of materials. Fabrication of these aircraft components can involve the bonding of metal with disparate materials, which can contain plastic, carbon, aramid, or fiberglass as reinforcement fiber, using a matrix resin, such as polyester, epoxy, polyimide, or bismaleimide. In another exemplary embodiment, the modules can be made of the same or different material than the Modular TTR fuselage 82.

The fuselage attachment member 92 can be operably coupled to at least a portion of the Modular TTR fuselage 82. In another exemplary embodiment, the attachment member 92 can be shaped to contour to the Modular TTR fuselage 82. In another exemplary embodiment, the attachment member 92 can be removably coupled to the Modular TTR fuselage 82 via a plurality of fasteners. The fasteners can include bolts, nuts, latches, compression mechanisms, magnets, hydraulic mechanisms, or other suitable means of attachment.

The Modular TTR 80 can be configured to include an inboard wing 93. In one exemplary embodiment, the inboard wing 93 can be operably coupled to the fuselage attachment member 92 via one or more fasteners. The inboard wing 93 can provide lift to the Modular TTR 80 to reduce the strain on the rotor assemblies 84 and 86. In another exemplary embodiment, the inboard wing 93 can be releasably coupled to either or both sides of the fuselage attachment member 92. In another exemplary embodiment, the inboard wing 93 can include an aileron.

The Modular TTR 80 can be configured to include an outboard wing 94. In one exemplary embodiment, the outboard wing 94 can be releasably coupled to the inboard wing 93 via one or more fasteners. In another exemplary embodiment, the outboard wing 94 can be directly coupled to the inboard wing 93 via one or more fasteners. In another exemplary embodiment, the outboard wing 94 can be indirectly coupled to the inboard wing 93 via a wing attachment member via one or more fasteners. The outboard wing 94 can provide lift to the Modular TTR 80 to reduce the strain on the rotor assemblies 84 and 86. In another exemplary embodiment, the outboard wing 94 can combine with the inboard wing 93 to provide greater lift to the Modular TTR 80. In another exemplary embodiment, the outboard wing 94 can include an aileron 97.

The Modular TTR 80 can be configured to include a tail boom 95. In one exemplary embodiment, the tail boom 95 can be releasably coupled to the inboard wing 93, the outboard wing 94, or the wing attachment member via one or more fasteners. The boom 95 can extend rearwardly from the wings 93 and 94. The Modular TTR 80 can be configured to include an empennage 96. In one exemplary embodiment, the empennage 96 can be releasably coupled to the boom 95 via one or more fasteners. The empennage 96 can provide lift to the Modular TTR 80 to reduce the strain on the rotor assemblies 84 and 86. In another exemplary embodiment, the empennage 96 can combine with the inboard wing 93 and the outboard wing 94 to provide even greater lift to the Modular TTR 80. In another exemplary embodiment, the empennage 96 can include vertical and or horizontal portions. In another exemplary embodiment, the empennage 96 can include a rudder 97. In another exemplary embodiment, the empennage 96 can include an elevator 99.

Figure 10:
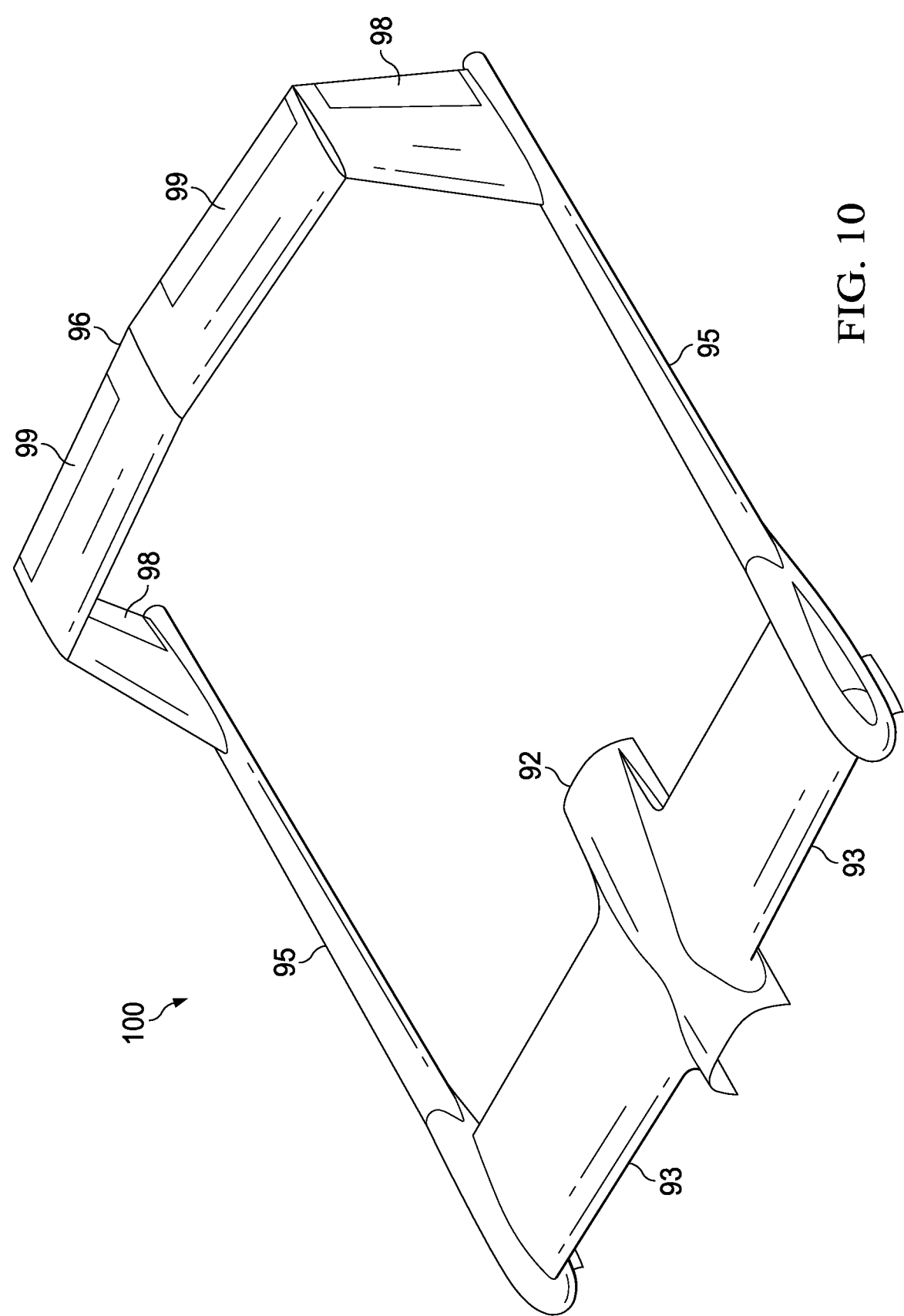
FIG. 10 is a perspective view of the mid-range flight assembly for a modular tandem tiltrotor aircraft, in accordance with an embodiment of the present disclosure.

FIG. 10 is a perspective view of the mid-range flight assembly, generally designated as 100, for a modular tandem tiltrotor aircraft, in accordance with an embodiment of the present disclosure. In one exemplary embodiment, the mid-range flight assembly 100 can include one or more modules, such as a fuselage attachment member 92, an inboard wing 93, a tail boom 95, and an empennage 96. In another exemplary embodiment, the Modular TTR 80 can be configured to include one or more modules on either side of the fuselage 82. In another exemplary embodiment, the modules can be selected based on the particular application for the Modular TTR 80.

The Modular TTR 80 can be configured with a mid-range flight assembly 100 to provide a customized configuration for a particular mid-range application via its implementation of modular components. The Modular TTR 80 can be configured with a mid-range flight assembly 90 that can provide more lift than a Modular TTR 80 arranged in a heavy lift configuration, but less weight than a Modular TTR 80 configured with a long-range flight assembly 90.

The Modular TTR 80 can be configured with a customized configuration for a particular application via its implementation (or not) of modular components. For example, applications that fall between large area and single area applications can utilize a mid-range assembly configuration where smaller inboard wings and an empennage can be implemented, but larger outboard wings can be jettisoned, to strike the appropriate balance for a mid-tier application. The fuselage attachment member 92, an inboard wing 93, a tail boom 95, and an empennage 96 can be configured as discussed in more detail in FIG. 9. However, a mid-range flight assembly 100, for a Modular TTR 80 does not include outboard wings 94.

Figure 11:
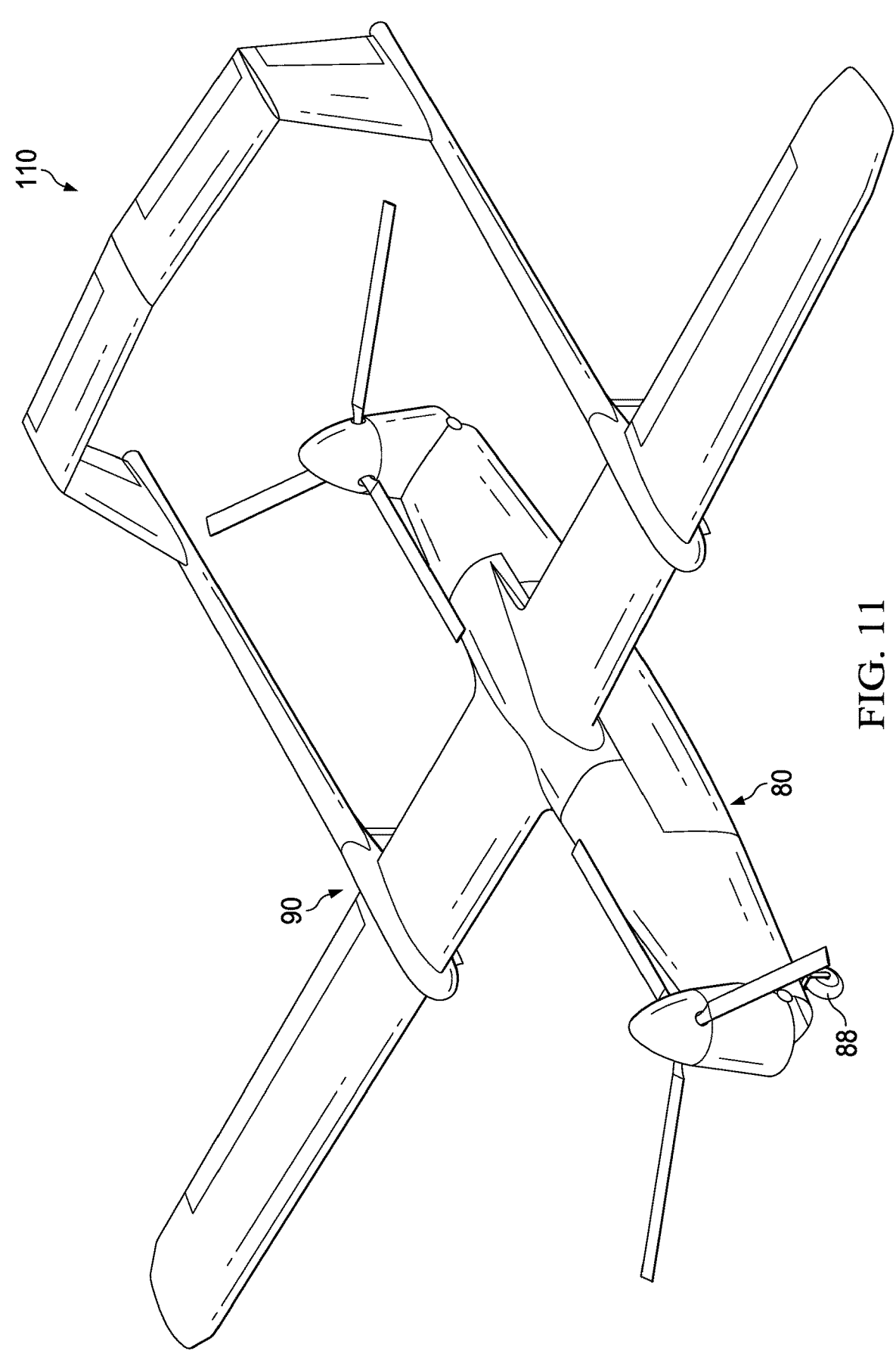
FIG. 11 is a perspective view of a modular tandem tiltrotor aircraft arranged in a long-range flight configuration, in accordance with an embodiment of the present disclosure.

FIG. 11 is a perspective view of a modular tandem tiltrotor aircraft arranged in a long-range flight configuration, generally designated as 110, in accordance with an embodiment of the present disclosure. In one exemplary embodiment, the long-range Modular TTR 110 can be configured with a long-range flight assembly 90 to provide a customized configuration for a particular long-range application via its implementation of modular components. In another exemplary embodiment, the long-range flight assembly 90 can be releasably coupled to the long-range Modular TTR 110. The Modular TTR 80 can be configured with a long-range flight assembly 90 that can provide additional lift such that the long-range Modular TTR 110 can stay in flight longer than traditional TTRs. Where a large swath of coverage is preferred, wings, empennage, and landing gear can be added to the Modular TTR to aid its efficiency. In another exemplary embodiment the landing gear 88 can be wheels, skids, or other suitable mechanisms.

As discussed above, Modular TTR 80 can also be reconfigured into a tandem helicopter (heavy lift configuration) when the application doesn't require range or when it is desirable to maximize lifting capacity. The long-range flight assembly 90 can modularly detach, allowing the Modular TTR 80 to autonomously recognize its new configuration to be ready for immediate deployment.

Figure 12A:
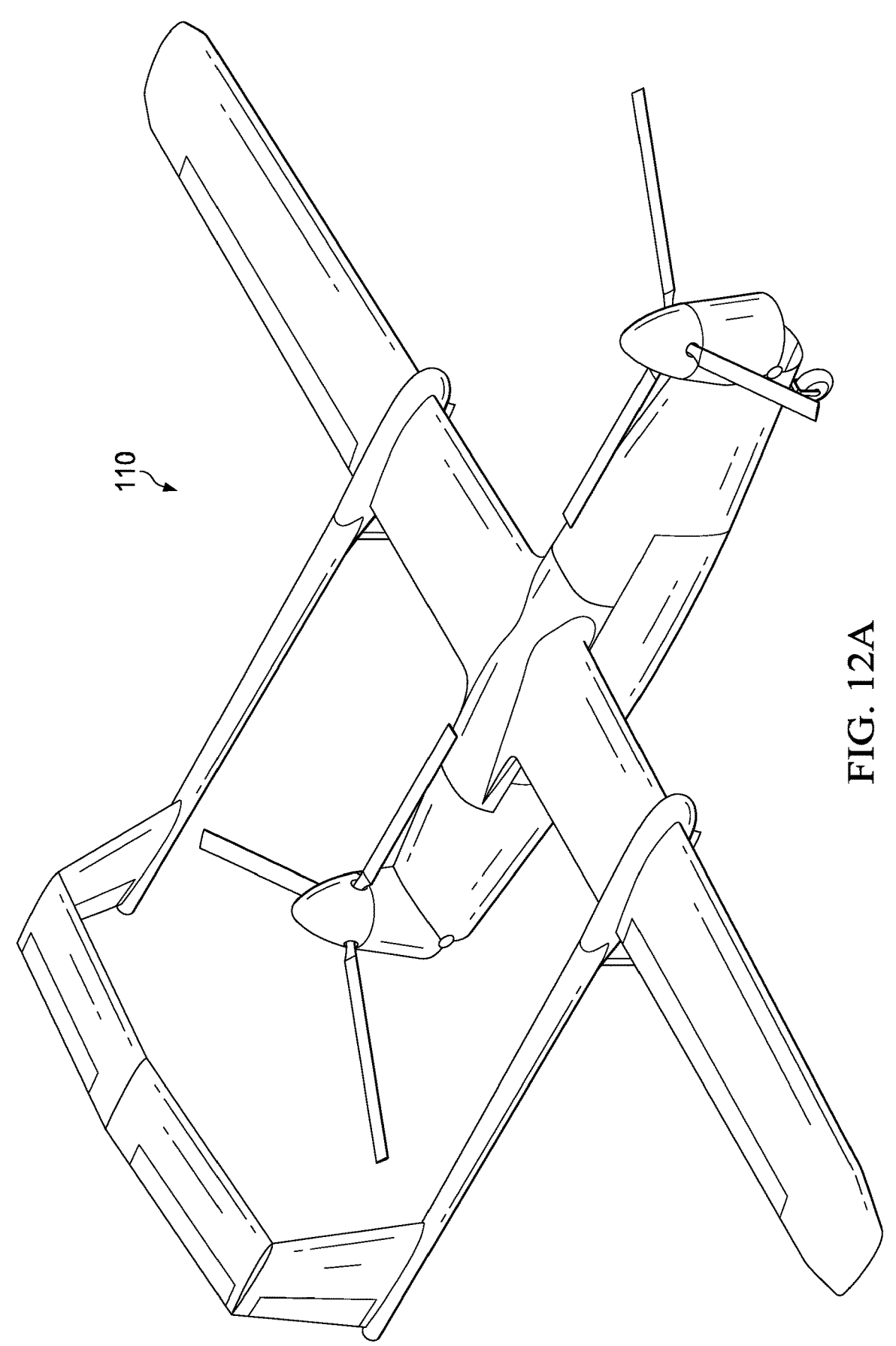
FIG. 12A is a perspective view of a modular tandem tiltrotor aircraft arranged in a long-range flight configuration with the rotors in a hover position, in accordance with an embodiment of the present disclosure.
Figure 12B:
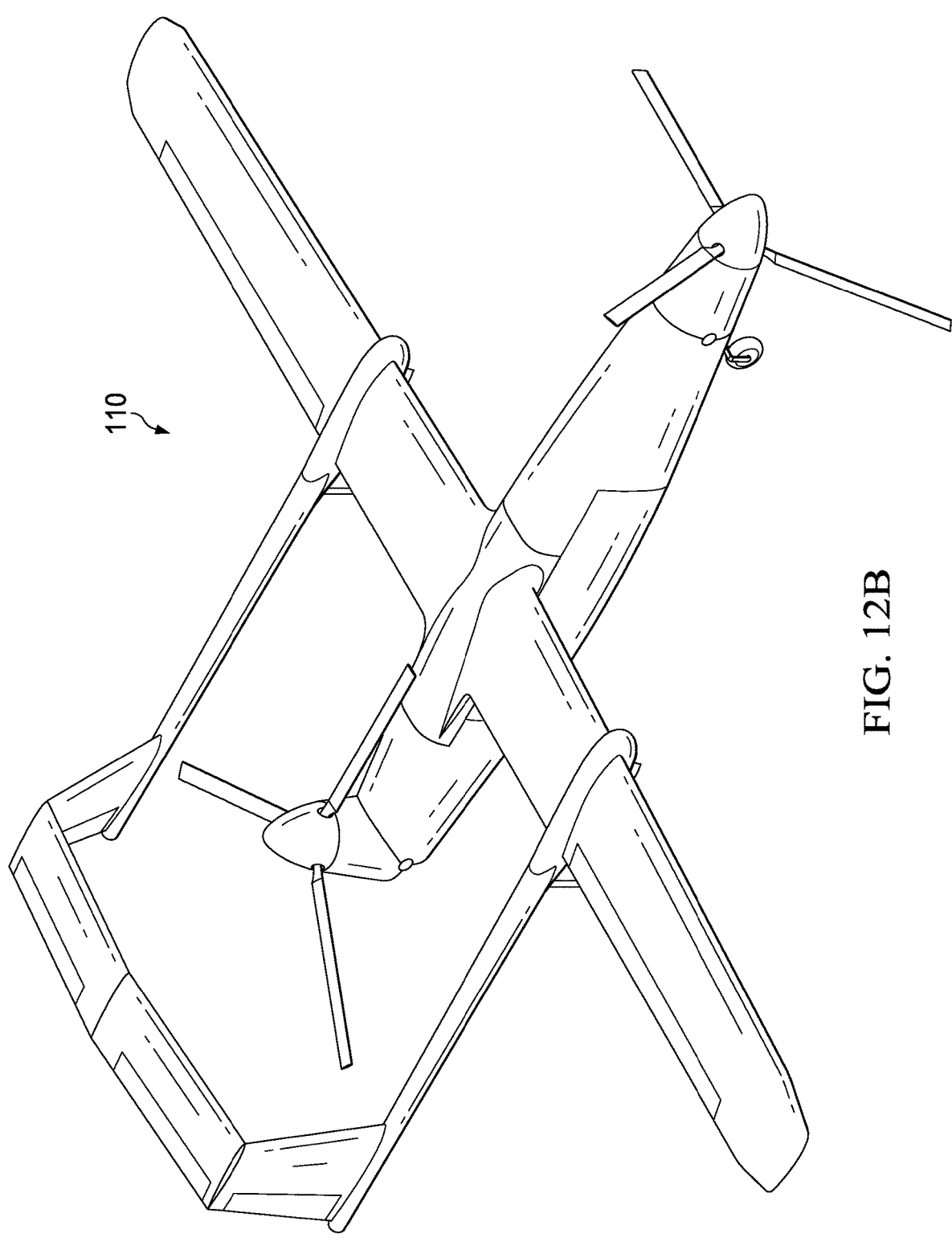
FIG. 12B is a perspective view of a modular tandem tiltrotor aircraft arranged in a long-range flight configuration with the rotors in a transition position, in accordance with an embodiment of the present disclosure.
Figure 12C:
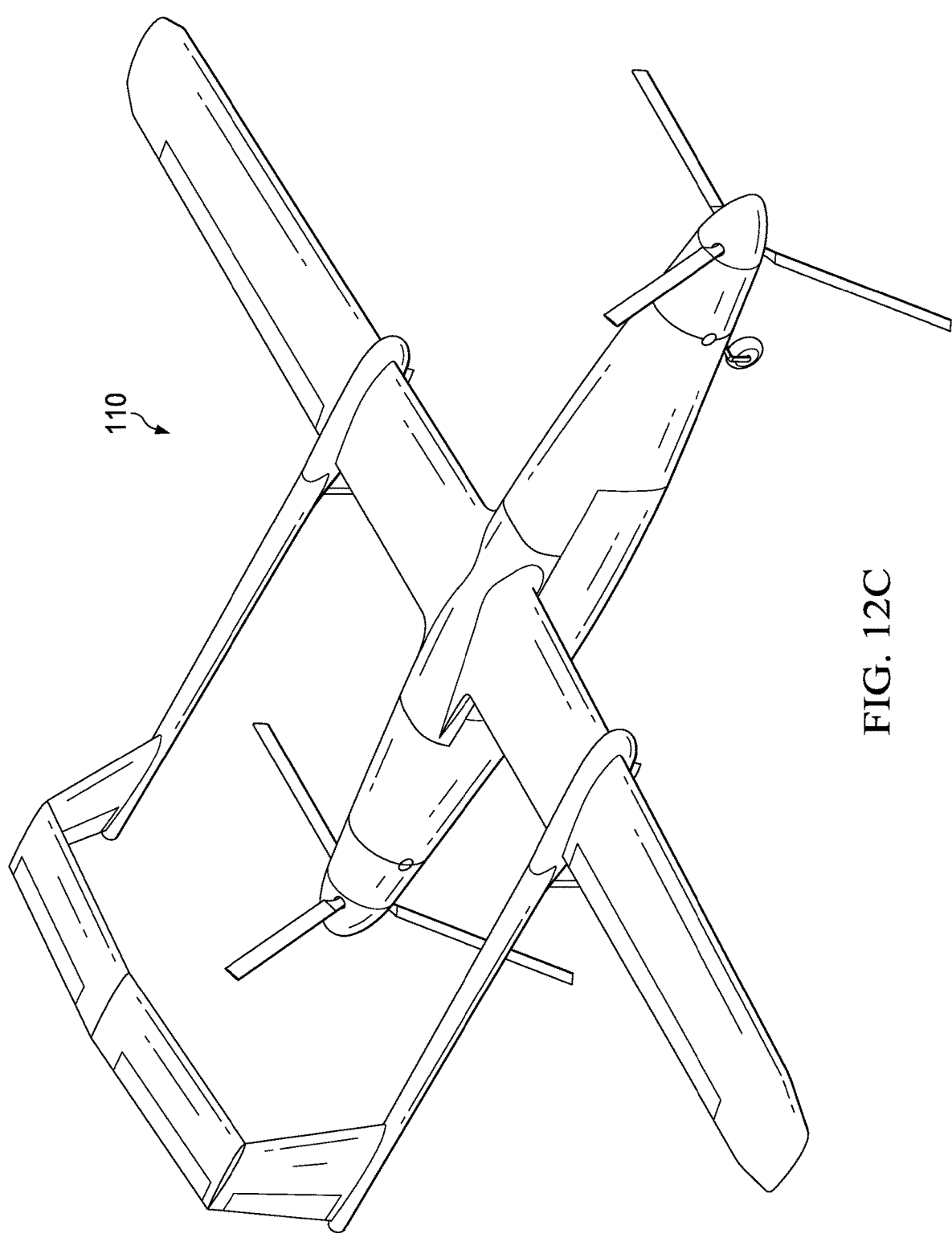
FIG. 12C is a perspective view of a modular tandem tiltrotor aircraft arranged in a long-range flight configuration with the rotors in a cruise position, in accordance with an embodiment of the present disclosure.

The Modular TTR 110 can have three primary phases of flight as shown in FIGS. 12A-12C. FIG. 12A is a perspective view of a modular tandem tiltrotor aircraft 110 arranged in a long-range flight configuration with the rotors in a hover position, in accordance with an embodiment of the present disclosure. FIG. 12B is a perspective view of a modular tandem tiltrotor aircraft 110 arranged in a long-range flight configuration with the rotors in a transition position, in accordance with an embodiment of the present disclosure. FIG. 12C is a perspective view of a modular tandem tiltrotor aircraft 110 arranged in a long-range flight configuration with the rotors in a cruise position, in accordance with an embodiment of the present disclosure.

The Modular TTR 110 can take off and land, conduct low-speed maneuvering in vertical takeoff and landing (VTOL) with the rotors in a Hover position, and travel long distances or fly for long periods with the rotors in a Cruise position. Transition is a temporary state between Hover and Cruise modes. In one exemplary embodiment, Transition occurs by rotating the forward rotor downward as the aircraft increases speed; the wing becomes effective as the forward rotor continues to rotate into cruise mode. In another exemplary embodiment, once the Modular TTR 110 has achieved wing-borne flight, the rear rotor can feather its blades and rotates the rotor assemblies down into Cruise mode to conserve power and extend range. Additional details are provide above related to FIGS. 1 and 7.

Figure 13A:
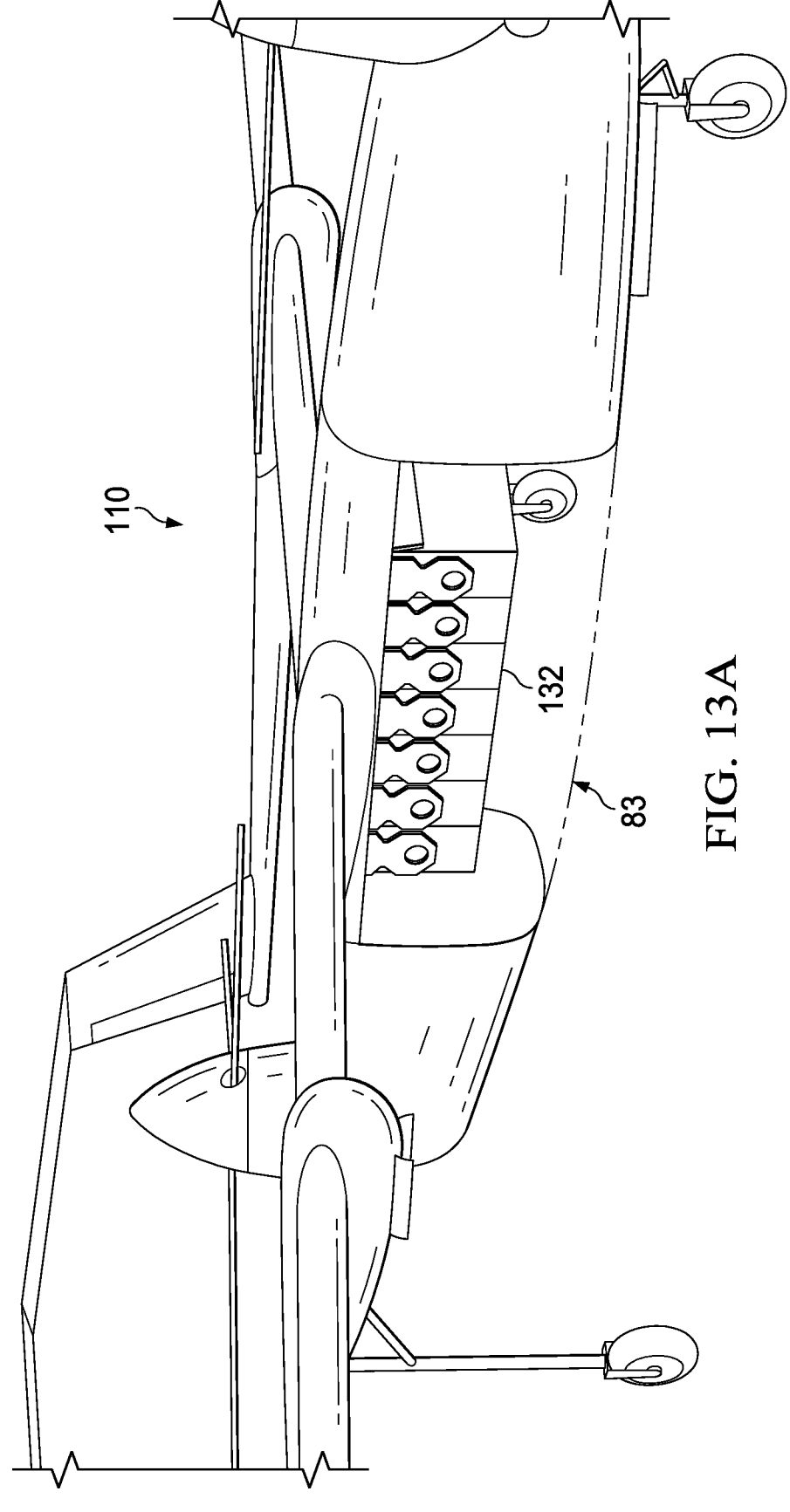
FIG. 13A is a perspective view of a cargo area for modular tandem tiltrotor aircraft arranged in a long-range flight configuration, in accordance with an embodiment of the present disclosure.
Figure 13B:
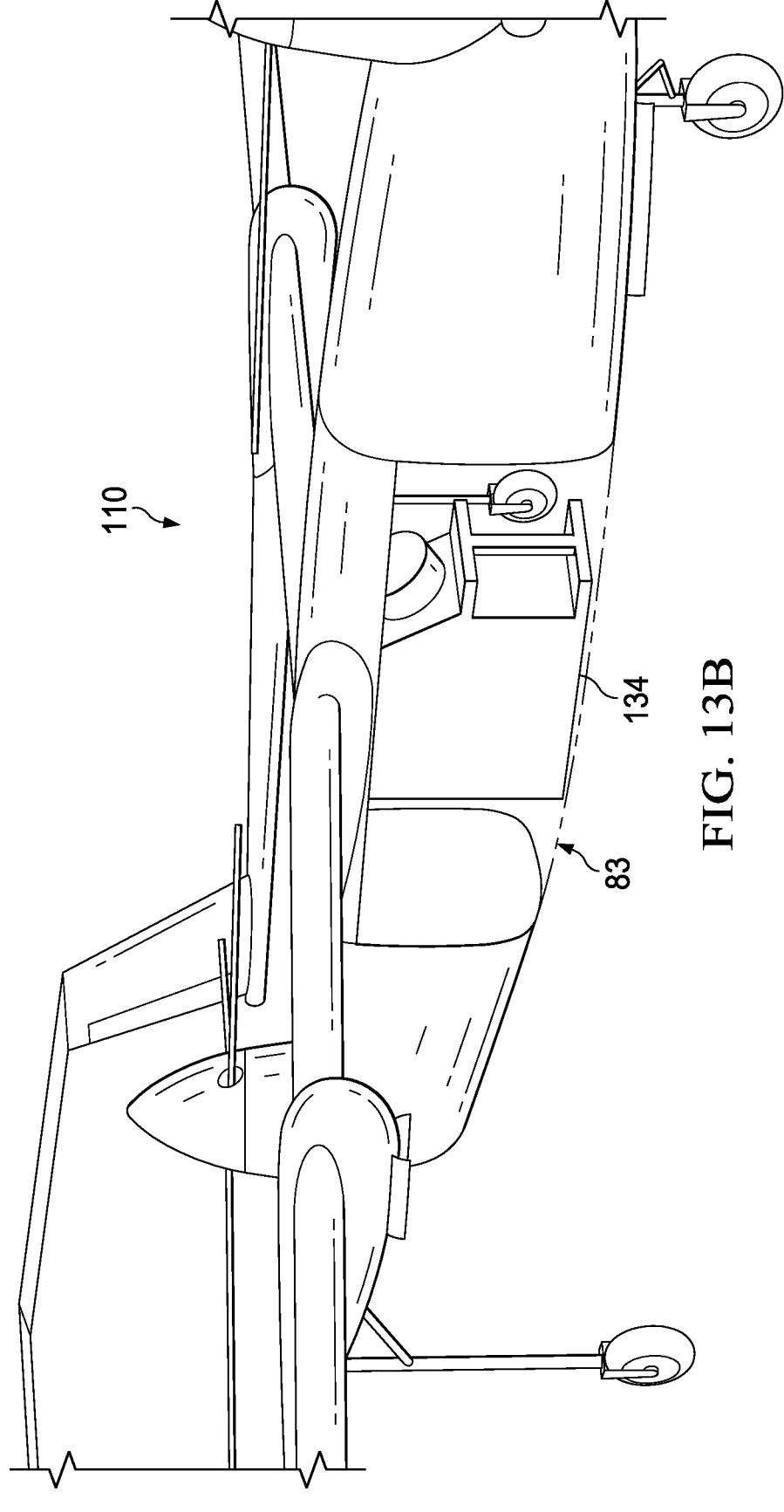
FIG. 13B is a perspective view of another cargo area for modular tandem tiltrotor aircraft arranged in a long-range flight configuration, in accordance with an embodiment of the present disclosure.

FIGS. 13A-13B are perspective views of a cargo area, generally designated as 83, for modular tandem tiltrotor aircraft 110 arranged in a long-range flight configuration, in accordance with an embodiment of the present disclosure. In one exemplary embodiment, the Modular TTR 110 can be configured for unmanned applications. In this scenario, the cargo area 83 can be utilized for internal storage of payloads. Payload retention within the cargo area 83 can be accomplished a number of different ways depending on the form factor of the payload. For example, FIG. 13A shows the Modular TTR 110 with seven cannisters 132 disposed within the cargo area 83. FIG. 13A shows the Modular TTR 110 with a five-gallon container 134 disposed within the cargo area 83.

Figure 14:
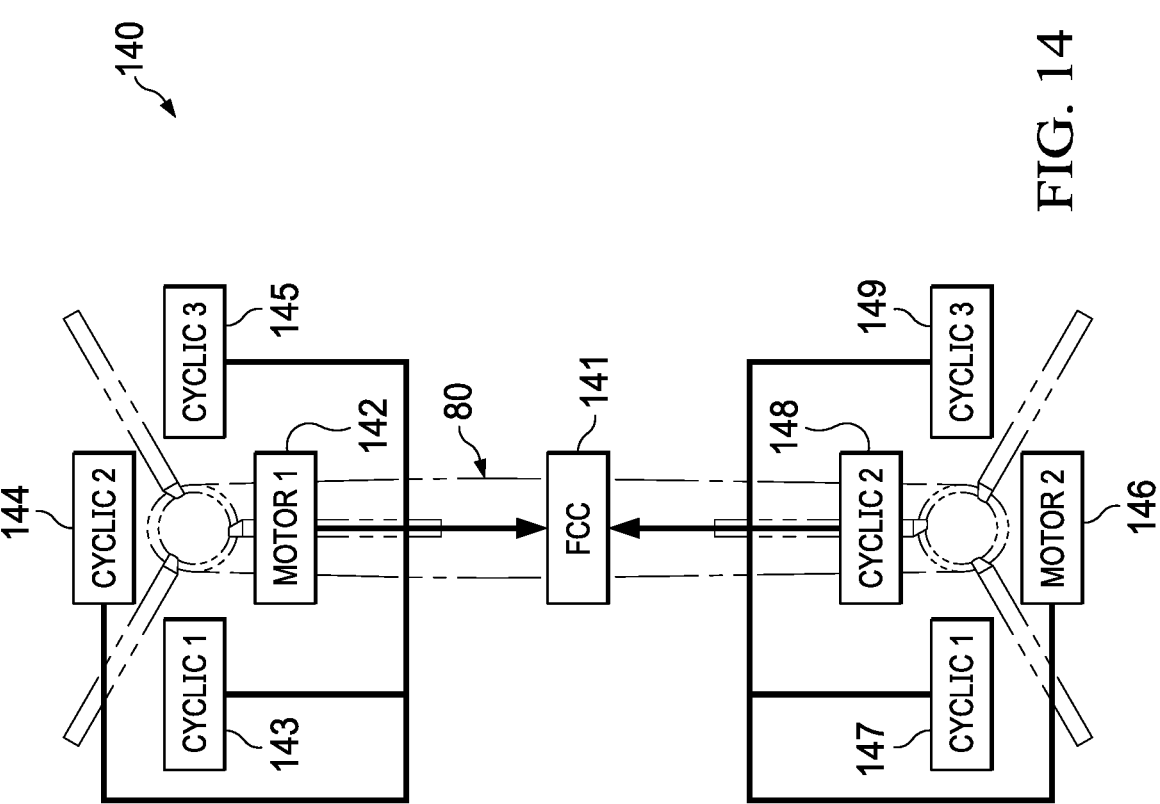
FIG. 14 is a network diagram depicting system component servos related to a modular tandem tiltrotor aircraft arranged in a heavy lift configuration, in accordance with an embodiment of the present disclosure.

In another exemplary embodiment, the cargo area 83 can have a cargo door that is remotely operable to open and close the cargo door. In another exemplary embodiment, the cargo area 83 can have a fairing disposed thereabout. In certain embodiments, payloads can exceed the width of the fuselage. In this scenario, the fairing can be removed and the payload can be coupled to the aircraft structure. Such payload handling versatility makes the Modular TTR 110 capable of handling a wide variety of payload shapes and sizes. In another exemplary embodiment, the Modular TTR 110 can receive a self-contained sensor payload. For example, the sensor payload can include cameras microphones, heat sensors, EO/IR cartridges, or other suitable sensors. In another exemplary embodiment, the cargo area 83 can include additional batteries to extend the vehicle's range and endurance. Additionally, the cargo area 83 can facilitate casualty evacuations. The Modular TTR's 110 speed, range, cargo area, and VTOL capability make it well-suited to quickly ingress and egress tight landing spaces FIG. 14 is a network diagram 140 depicting system component servos related to a modular tandem tiltrotor aircraft arranged in a heavy lift configuration 80, in accordance with an embodiment of the present disclosure. In one exemplary embodiment, a servo can be a small hinged device installed on an aircraft control surface to assist the movement of the control surface. The component network can include a modular tandem tiltrotor aircraft arranged in a heavy lift configuration 80, having a Flight Control Computer (FCC) 141, and servos for a first motor 142, first, second, and third cyclics 143, 144, 145 related to the first motor 142, a second motor 146, and first, second and third cyclics 147, 148, 149 related to the second motor 146, among other servos.

The Modular TTR 80 arranged in a heavy lift configuration can have one or more servos or modules that can be attached to this configuration. In one exemplary embodiment, an FCC 141 can be disposed within the Modular TTR 80. In another exemplary embodiment, each module or servo in any assembly can have a unique identifier. The unique identifier can identify each module to the FCC 141 as it is operably coupled to the Modular TTR 80. In another exemplary embodiment, the FCC 141 can communicate with the servos or modules via a Controller Area Network (CAN) bus. CAN is a multi-master serial bus standard for connecting Electronic Control Units (ECUs) also known as nodes, in this case, the modules or servos. For each device the data in a frame can transmitted sequentially but in such a way that if more than one device transmits at the same time the highest priority device is allowed to continue while the others are queued.

In another exemplary embodiment, the aforementioned system components can be communicably coupled to each other via a network, such as the Internet, intranet, or other suitable network. The communication can be encrypted, unencrypted, over a VPN tunnel, blockchain, or other suitable communication means. The network can be a WAN, LAN, PAN, mesh network, or other suitable network. The network communication between the system components can be encrypted to ensure HIPAA compliance using PGP, Blowfish, AES, 3DES, HTTPS, or other suitable encryption. The network communication can occur via application programming interface (API), CAN bus, PCI, PCI-Express, ANSI-X12, USB, Ethernet, Wi-Fi, Bluetooth, Zigbee, Z-Wave, Thread, or other suitable communication protocol or means.

In another exemplary embodiment, the FCC 141 can be implemented on a server, appliance, or device. The server can be implemented in hardware, software, or a suitable combination of hardware and software therefor, and may comprise one or more software systems operating on one or more servers, having one or more processors, with access to memory. Server(s) can include electronic storage, one or more processors, and/or other components. Server(s) can include communication lines, or ports to enable the exchange of information with a network and/or other computing platforms. Server(s) can also include a plurality of hardware, software, and/or firmware components operating together to provide the functionality attributed herein to server(s). For example, server(s) can be implemented by a cloud of computing platforms operating together as server(s). Additionally, the server can include memory.

Memory can comprise electronic storage that can include non-transitory storage media that electronically stores information. The electronic storage media of electronic storage may include one or both of system storage that is provided integrally (i.e., substantially non-removable) with server(s) and/or removable storage that is removably connectable to server(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store machine-readable instructions, software algorithms, information determined by processor(s), information received from server(s), information received from computing platform(s), and/or other information that enables server(s) to function as described herein. The electronic storage can also be accessible via a network connection.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information, such as FPGAs or ASICs. The processor(s) may be a single entity or include a plurality of processing units. These processing units may be physically located within the same device, or processor(s) may represent processing functionality of a plurality of devices operating in coordination or software functionality.

The processor(s) can be configured to execute machine-readable instruction or learning modules by software, hardware, firmware, some combination of software, hardware, and/or firmware, and/or other mechanisms for configuring processing capabilities on processor(s). As used herein, the term "machine-readable instruction" may refer to any component or set of components that perform the functionality attributed to the machine-readable instruction component. This can include one or more physical processors during execution of processor readable instructions, the processor readable instructions, circuitry, hardware, storage media, or any other components.

The server can be configured with machine-readable instructions having one or more functional modules. The machine-readable instructions can be implemented on one or more servers, having one or more processors, with access to memory. The machine-readable instructions can be on a single networked node, or a machine cluster, which can include a distributed architecture of a plurality of networked nodes. The machine-readable instructions can include control logic for implementing various functionality, as described in more detail below.

In another exemplary embodiment, the modules can be connectorized at the structural joints of the Modular TTR 80 to operably couple to each other via the CAN bus or other network connection. In another exemplary embodiment the Modular TTR 80 can be provide automated reconfiguration. For example, CAN servos can be operably coupled to ailerons, rudders, or elevators to operate those components. Each servo can have a unique identifier, such as a serial number or part number. In another exemplary embodiment, the servos can transmit its unique identifier to the FCC 141 over the network (e.g., CAN bus).

In one exemplary embodiment, the FCC 141 can have a built-in preflight check. In another exemplary embodiment, the built-in preflight check can determine the status or health of each component operably connected to the FCC 141. In another exemplary embodiment, the FCC 141 can have a predefined configuration for each mode of operation. The FCC 141 can determine the configuration of the Modular TTR 80 based on the responses it receives from servos related to the coupled modules. For example, in a tandem helicopter configuration the FCC 141 looks for communication with the servos located in the right-hand side (RHS) aileron, the left-hand side (LHS) aileron, the RHS rudder, the LHS rudder, the RHS elevator, and the LHS elevator. Since a tandem helicopter configuration would not have ailerons, rudders, or elevators, when none of the ailerons, rudders, or elevators are detected by the FCC 141, the FCC 141 can configure itself to operate with the settings for a tandem helicopter. In another exemplary embodiment, the predefined configuration can be retrieved from memory and processed by the FCC 141. The FCC 141 can process the configuration by setting certain system thresholds or values, such as maximum speed, rotor position, and other relevant thresholds or values. In another exemplary embodiment, a configuration validation can be required from a ground station or other relevant non-TTR location.

Figure 15:
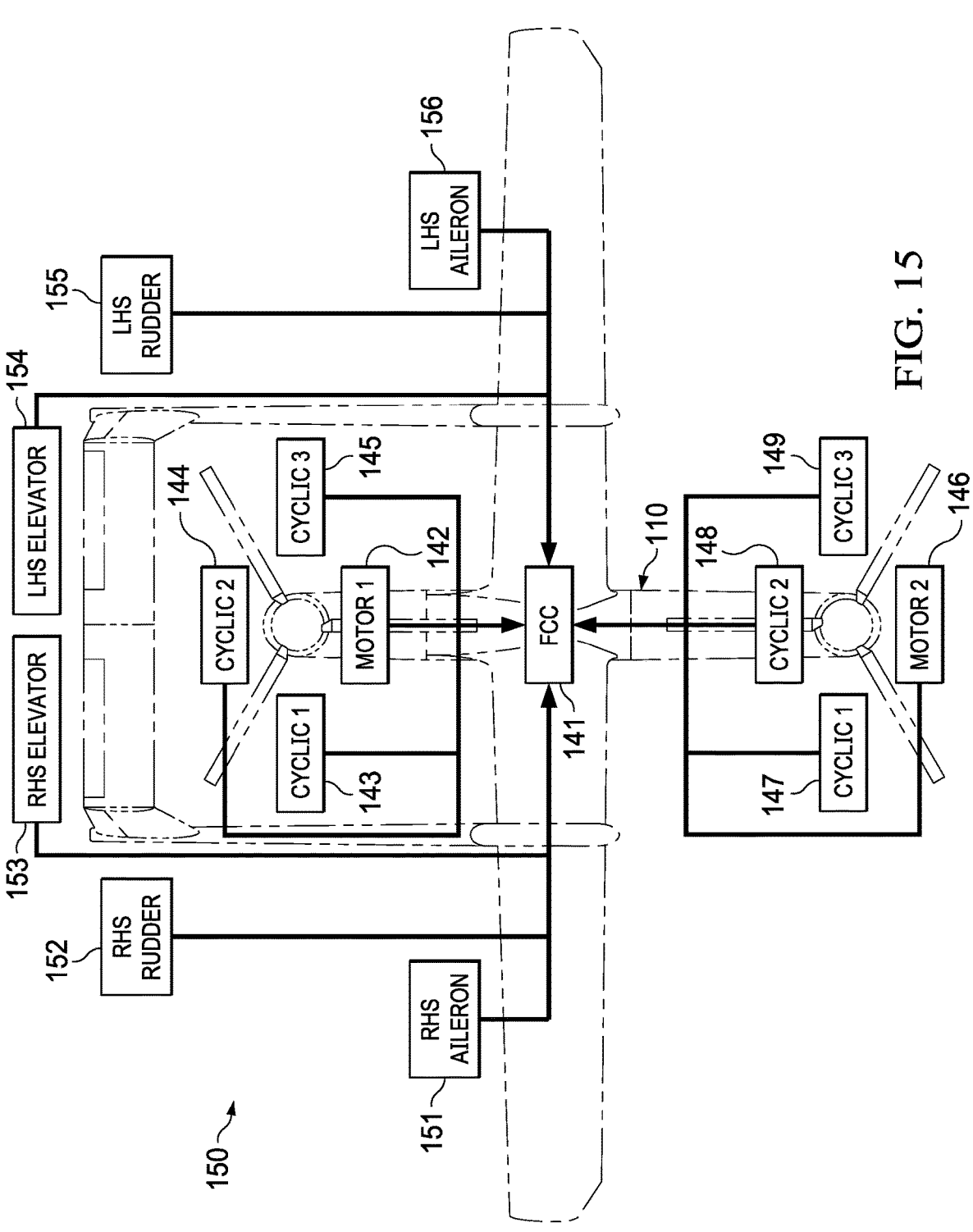
FIG. 15 is a network diagram depicting system component servos related to a modular tandem tiltrotor aircraft arranged in a long-range flight configuration, in accordance with an embodiment of the present disclosure.

FIG. 15 is a network diagram 150 depicting system component servos related to a modular tandem tiltrotor aircraft arranged in a long-range flight configuration 110, in accordance with an embodiment of the present disclosure. The component network can include a Modular TTR arranged in a long-range flight configuration 110, having a Flight Control Computer (FCC) 141, and servos for a first motor 142, first, second, and third cyclics 143, 144, 145 related to the first motor 142, a second motor 146, and first, second and third cyclics 147, 148, 149 related to the second motor 146, RHS aileron 151, LHS aileron 156, RHS rudder 152, LHS rudder 155, RHS elevator 153, and LHS elevator 155, among other servos.

The Modular TTR 80 arranged in a long-range flight configuration can have one or more servos or modules that can be attached to this configuration. In one exemplary embodiment, an FCC 141 can be disposed within the Modular TTR 110. In another exemplary embodiment, each module or servo in any assembly can have a unique identifier. The unique identifier can identify each module or servo to the FCC 141 as it is operably coupled to the Modular TTR 110. In another exemplary embodiment, the FCC 141 can communicate with the servos or modules via a Controller Area Network (CAN) bus. In another exemplary embodiment, the FCC 141 can communicate with the servos or modules via a Controller Area Network (CAN) bus.

In another exemplary embodiment, the modules can be connectorized at the structural joints of the Modular TTR 110 to operably couple to each other via the CAN bus or other network connection. In another exemplary embodiment the Modular TTR 110 can be provide automated reconfiguration. For example, CAN servos can be operably coupled to ailerons, rudders, or elevators to operate those components. Each device can have a unique identifier, such as a serial number or part number. In another exemplary embodiment, the devices (e.g., servos or modules) can transmit its unique identifier to the FCC 141 over the network (e.g., CAN bus).

In one exemplary embodiment, the FCC 141 can have a built-in preflight check. In another exemplary embodiment, the built-in preflight check can determine the status or health of each device operably connected to the FCC 141. In another exemplary embodiment, the FCC 141 can have a predefined configuration for each mode of operation. In another exemplary embodiment, the FCC 141 can be configured to receive a unique identifier from one or more devices to determine the mode of operation, such as tandem helicopter, tiltrotor, or other relevant configuration. The FCC 141 can determine the configuration of the Modular TTR 110 based on the responses it receives from servos related to the coupled modules. For example, in a tiltrotor configuration the FCC 141 looks for communication (e.g., signals, data, or acknowledgements) with the servos located in the right-hand side (RHS) aileron, the left-hand side (LHS) aileron, the RHS rudder, the LHS rudder, the RHS elevator, and the LHS elevator. Since a tiltrotor configuration would have ailerons, rudders, or elevators, when all of the ailerons, rudders, or elevators are detected by the FCC 141, the FCC 141 can configure itself to operate with the settings for a tiltrotor. In another exemplary embodiment, the predefined configuration can be retrieved from memory and processed by the FCC 141. The FCC 141 can process the predefined configuration by setting certain system thresholds or values, such as maximum speed, rotor position, and other relevant thresholds or values. In another exemplary embodiment, a configuration validation can be required from a ground station or other relevant non-TTR location. In another exemplary embodiment, the FCC 141 can retrieve system thresholds or values for the determined mode of operation. In another exemplary embodiment, the FCC 141 can configure one or more system settings according to the retrieved thresholds or values.

In one exemplary embodiment, a Modular TTR 110 configuration may be present, but there may be a servo failure. In such situations, the FCC 141 looks for communication with the servos located in the right-hand side (RHS) aileron, the left-hand side (LHS) aileron, the RHS rudder, the LHS rudder, the RHS elevator, and the LHS elevator. When some, but not all of the ailerons, rudders, or elevators are detected by the FCC 141, the FCC 141 can generate a diagnostic fault code. In another exemplary embodiment, the fault code can identify those servos or modules for which no communication was received. In another exemplary embodiment, the FCC 141 can transmit a notification to a ground station, or other relevant device.

Figure 16A:
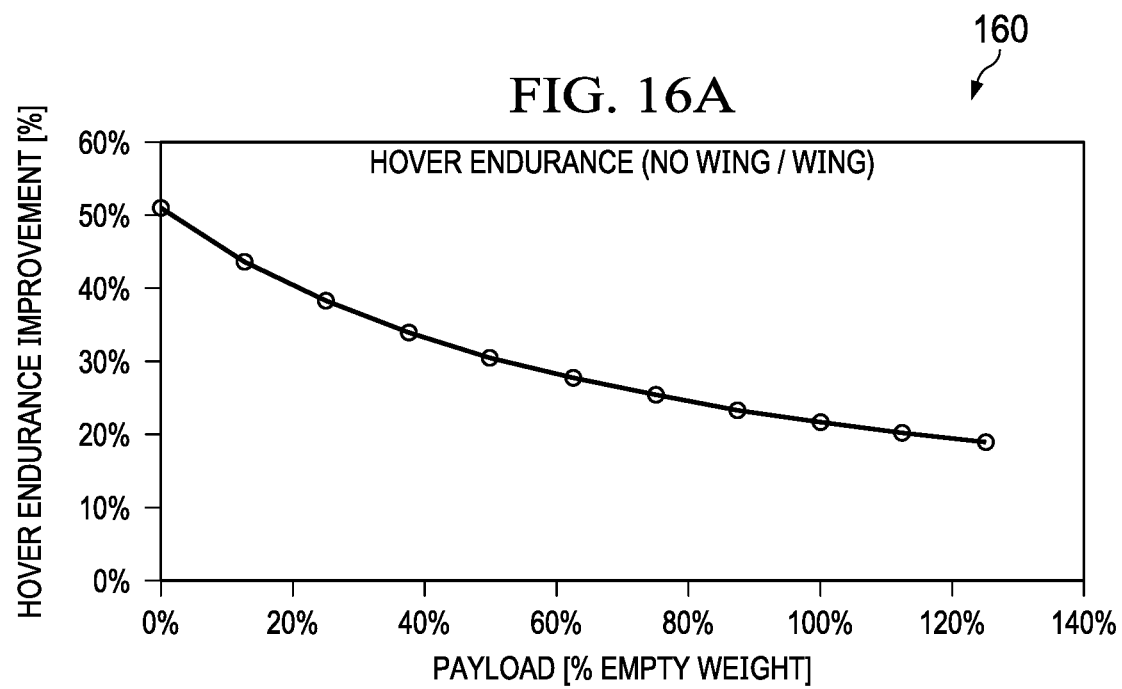
FIG. 16A is a graph of the hover endurance for a modular tandem tiltrotor aircraft, in accordance with an embodiment of the present disclosure.
Figure 16B:
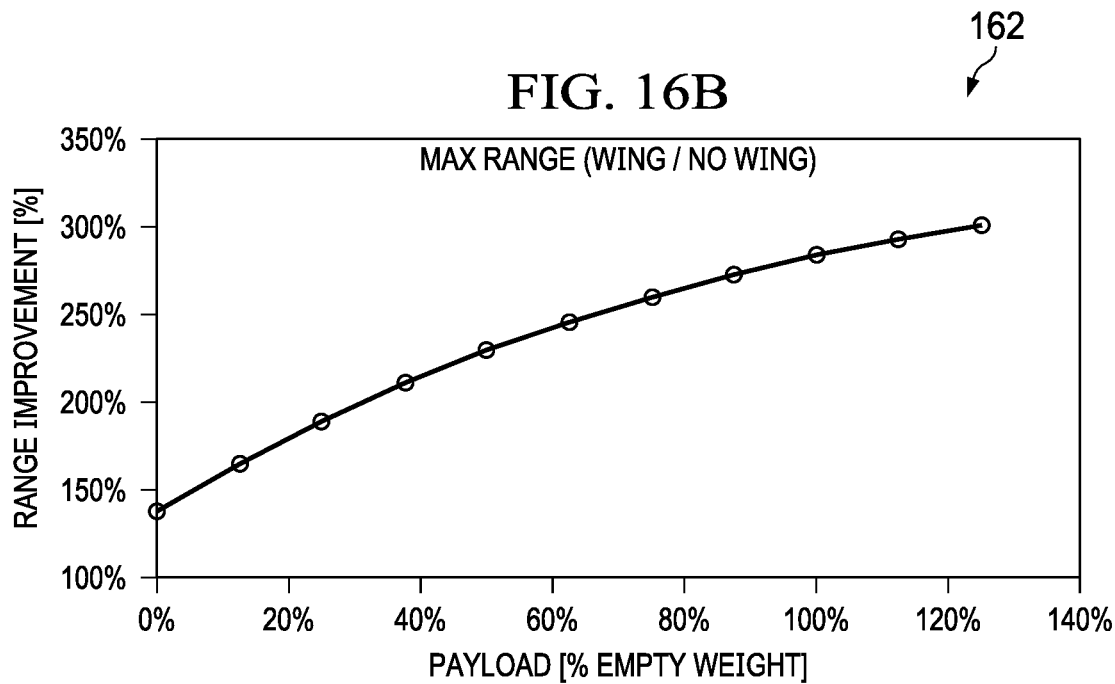
FIG. 16B is a graph of the maximum range for a modular tandem tiltrotor aircraft, in accordance with an embodiment of the present disclosure.

The graphs illustrated in FIGS. 16A-16B show the potential performance benefits that each Modular TTR configuration could yield. FIG. 16A is a graph of the hover endurance for a modular tandem tiltrotor aircraft, in accordance with an embodiment of the present disclosure. In one exemplary embodiment, a Modular TTR with the wings/tail remove can hover 50% more than a Modular TTR with the wing installed. This graph estimates that relationship to payload. The graph is baselined at 0% such that 0% is no change. As such, the endurance is about +50% and range +300%. FIG. 16B is a graph of the maximum range for a modular tandem tiltrotor aircraft, in accordance with an embodiment of the present disclosure. In one exemplary embodiment, a Modular TTR with wing installed has up to 300% more range than a Modular TTR in helicopter mode configuration. The plot below estimates that relationship to payload.

The present invention achieves at least the following advantages:

1. Tandem arrangement provides for reduced drag, no increase to overall footprint, and reduced part count;
2. Cyclic Rotor Control provides for faster control input-response, more control margin, and better cross-wind landing performance;
3. Large Diameter Rotor provides for higher rotor efficiency, better lifting capacity, lower disk loading, and a quieter motor & rotor;
4. Multiple in-flight configurations allow aircraft flexibility to satisfy mission needs;
5. Can fly off rotors to higher speeds with rotor-borne flight through stall region; and
6. Better CG envelope as helicopter mode CG can be compensated with differential thrust allowing for better airplane mode CG placement.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

While the disclosure has described a number of embodiments, it is not thus limited and is susceptible to various changes and modifications without departing from the spirit thereof. Persons skilled in the art will understand that this concept is susceptible to various changes and modifications, and may be implemented or adapted readily to other types of environments. For example, different rotor diameters for the forward and aft rotor assemblies, orthogonal rotor assemblies, full cyclic or only lateral, and variable RPM vs. collective at small scale are all within the scope of the present disclosure. The present embodiments are therefore to be considered in all respects as illustrative and not restrictive. Accordingly, the scope of the disclosure can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A modular tandem tiltrotor aircraft, comprising:
a fuselage comprising:
a fuselage axis;
a forward end along the fuselage axis; and
an aft end along the fuselage axis;
a forward rotor assembly coupled to the forward end of the fuselage along the fuselage axis and operably rotatable between a first position and a second position;
an aft rotor assembly coupled to the aft end of the fuselage along the fuselage axis and operably rotatable between the first position and a second; and
a flight control computer configured to receive a unique identifier associated with one or more devices of the modular tandem tiltrotor aircraft to determine a mode of operation of the modular tandem tiltrotor aircraft, wherein the mode of operation includes at least a tandem helicopter mode and a tiltrotor mode, wherein the unique identifier from the one or more devices includes a real-time acknowledgment signal generated by the one or more devices, wherein the flight control computer determines the mode of operation based on the acknowledgment signal, such that receiving the acknowledgment signal indicates that the one or more devices are currently installed on the modular tandem tiltrotor aircraft and a failure to receive the acknowledgment signal indicates that the one or more devices are currently absent from the modular tandem tiltrotor aircraft, wherein the flight control computer determines the mode of operation by:
automatically setting the modular tandem tiltrotor aircraft in the tandem helicopter mode in response to a determination that no aileron, rudder, or elevator are currently installed on the modular tandem tiltrotor aircraft based on the acknowledgment signal, wherein setting the modular tandem tiltrotor aircraft in the tandem helicopter mode includes configuring the modular tandem tiltrotor aircraft to operate with settings associated with the tandem helicopter mode of operation; and
automatically setting the modular tandem tiltrotor aircraft in the tiltrotor mode in response to a determination that at least one aileron, at least one rudder, and at least one elevator are currently installed on the modular tandem tiltrotor aircraft based on the acknowledgment signal, wherein setting the modular tandem tiltrotor aircraft in the tandem helicopter mode includes configuring the modular tandem tiltrotor aircraft to operate with settings associated with the tiltrotor mode of operation.

2. The modular tandem tiltrotor aircraft of claim 1, wherein the first position disposes the rotor blades above the fuselage.

3. The modular tandem tiltrotor aircraft of claim 1, wherein the second position disposes the rotor blades in-line with the fuselage axis.

4. The modular tandem tiltrotor aircraft of claim 1, wherein the flight control computer includes a built-in preflight check.

5. The modular tandem tiltrotor aircraft of claim 1, wherein the settings include one or more of thresholds and values associated with the tandem helicopter mode of operation.

6. The modular tandem tiltrotor aircraft of claim 1, wherein the settings include one or more of thresholds and values associated with the tiltrotor mode of operation.

7. A modular tandem tiltrotor aircraft, comprising:
a fuselage comprising:
a fuselage axis;
a forward end along the fuselage axis; and
an aft end along the fuselage axis;
a forward rotor assembly coupled to the forward end of the fuselage along the fuselage axis and rotatable to a plurality of positions, wherein the forward rotor assembly comprises a cyclic control mechanism configured to adjust the rotor blades cyclically; and
wherein a flight control computer is configured to adjust the cyclic control mechanism operation associated with the forward motor assembly to provide control input-response during a mode of;
an aft rotor assembly coupled to the aft end of the fuselage along the fuselage axis and rotatable to a plurality of positions, wherein the aft rotor assembly comprises a cyclic control mechanism configured to adjust the rotor blades cyclically; and
wherein the flight control computer is configured to adjust the cyclic control mechanism associated with the aft motor assembly to provide control input-response during the mode of operation;
a flight assembly releasably coupled to the fuselage, wherein the flight assembly is configurable between:
a first configuration including a fuselage attachment member configured to attach to at least a portion of the fuselage, an inboard wing operably coupled at a first end to the fuselage attachment member, an outboard wing operably coupled to a second end of the inboard wing, a tail boom operably coupled at a first end to one or more of the inboard wing and the outboard wing and extending rearwardly at a second end, and an empennage operably coupled to the second end of the tail boom, the first configuration configured for long-range flight operations to provide a higher lift to the modular tandem tiltrotor aircraft than a modular tandem tiltrotor aircraft without the flight assembly in the first configuration; and
a second configuration excluding the outboard wing, the fuselage attachment member, the inboard wing, the tail boom, and the empennage, the second configuration configured for one or more of heavy lifting and long-dwelling operations; and
the flight control computer configured to receive a unique identifier associated with one or more devices of the modular tandem tiltrotor aircraft to determine a mode of operation of the modular tandem tiltrotor aircraft, wherein the mode of operation includes at least a tandem helicopter mode corresponding to the second configuration and a tiltrotor mode corresponding to the first configuration, wherein the unique identifier from the one or more devices includes a real-time acknowledgment signal generated by the one or more devices, wherein the flight control computer determines the mode of operation based on the acknowledgment signal, such that receiving the acknowledgment signal indicates that the one or more devices are currently installed on the modular tandem tiltrotor aircraft and a failure to receive the acknowledgment signal indicates that the one or more devices are currently absent from the modular tandem tiltrotor aircraft, wherein the flight control computer determines the mode of operation by:

automatically setting the modular tandem tiltrotor aircraft in the tandem helicopter mode in response to a determination that no aileron, rudder, or elevator are currently installed on the modular tandem tiltrotor aircraft based on the acknowledgment signal, wherein setting the modular tandem tiltrotor aircraft in the tandem helicopter mode includes configuring the modular tandem tiltrotor aircraft to operate with settings settings associated with the tandem helicopter mode of operation; and automatically setting the modular tandem tiltrotor aircraft in the tiltrotor mode in response to a determination that at least one aileron, at least one rudder, and at least one elevator are currently installed on the modular tandem tiltrotor aircraft based on the acknowledgment signal, wherein setting the modular tandem tiltrotor aircraft in the tandem helicopter mode includes configuring the modular tandem tiltrotor aircraft to operate with settings associated with the tiltrotor mode of operation.

8. The modular tandem tiltrotor aircraft of claim 7, wherein the flight control computer includes a built-in preflight check.

9. The modular tandem tiltrotor aircraft of claim 7, wherein the settings include one or more of thresholds and values associated with the tiltrotor mode of operation.

10. The modular tandem tiltrotor aircraft of claim 7, wherein the settings include one or more of thresholds and values associated with the tiltrotor mode of operation.

* * * * *